(12) United States Patent
Mori et al.

(10) Patent No.: US 11,019,233 B2
(45) Date of Patent: May 25, 2021

(54) OPTICAL SCANNING DEVICE, LASER DIODE DRIVER AND IMAGE FORMING APPARATUS HAVING SHIFT REGISTER TO RECEIVE A SHIFT SIGNAL

(71) Applicant: Brother Kogyo Kabushiki Kaisha, Nagoya (JP)

(72) Inventors: Takato Mori, Nagoya (JP); Hiroshi Ono, Konan (JP); Kunihiro Amano, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/814,078

(22) Filed: Mar. 10, 2020

(65) Prior Publication Data

US 2020/0304675 A1  Sep. 24, 2020

(30) Foreign Application Priority Data

Mar. 22, 2019  (JP) .............................. JP2019-054591

(51) Int. Cl.
| | |
|---|---|
| *G06F 15/00* | (2006.01) |
| *G06K 1/00* | (2006.01) |
| *G06K 15/12* | (2006.01) |
| *H04N 1/028* | (2006.01) |

(52) U.S. Cl.
CPC ......... *H04N 1/0283* (2013.01); *H04N 1/0284* (2013.01)

(58) Field of Classification Search
CPC ........................... H04N 1/0283; H04N 1/0284
USPC .......................... 358/1.7, 1.1, 505, 474, 480
See application file for complete search history.

(56) References Cited

U.S. PATENT DOCUMENTS

| | | | |
|---|---|---|---|
| 2014/0362154 A1 | 12/2014 | Takezawa | |
| 2016/0210892 A1* | 7/2016 | Ohara | ................... G09G 3/3266 |
| 2018/0218244 A1* | 8/2018 | Yano | ................... H04N 1/02815 |
| 2020/0219446 A1* | 7/2020 | Yoshida | ............... G09G 3/3266 |

FOREIGN PATENT DOCUMENTS

| | | |
|---|---|---|
| JP | 2012-098596 A | 5/2012 |
| JP | 2014-240872 A | 12/2014 |

* cited by examiner

*Primary Examiner* — Douglas Q Tran
(74) *Attorney, Agent, or Firm* — Burr & Brown, PLLC

(57) ABSTRACT

An optical scanning device includes a controller, and a scanning unit connected with the controller via a signal line. The scanning unit includes a semiconductor laser having light emitting elements, an optical system configured to convert light emitted by each light emitting element into a beam, a deflector configured to deflect the beam received through the optical system, and a shift register including a plurality of output terminals each configured to output a light emission signal for controlling light emission from a corresponding one of the light emitting elements, and an input terminal configured to receive a shift signal from the controller via the signal line. The shift register is configured to, each time receiving the shift signal via the input terminal, shift a specific output terminal to output the light emission signal from one output terminal to another in sequence among the plurality of output terminals.

17 Claims, 11 Drawing Sheets

| STATE | | 1 | 2 | 3 | 4 | 5 | 6 | 7 | 8 |
|---|---|---|---|---|---|---|---|---|---|
| OUTPUT LEVEL | CH1 | L | H | H | H | H | H | H | H |
| | CH2 | H | L | H | H | H | H | H | H |
| | CH3 | H | H | L | H | H | H | H | H |
| | CH4 | H | H | H | L | H | H | H | H |
| | Ch5 | H | H | H | H | L | H | H | H |
| | Ch6 | H | H | H | H | H | L | H | H |
| | CH7 | H | H | H | H | H | H | L | H |
| | CH8 | H | H | H | H | H | H | H | L |

L. LOW
H: HIGH

FIG. 7

OPTICAL SCANNING DEVICE, LASER DIODE DRIVER AND IMAGE FORMING APPARATUS HAVING SHIFT REGISTER TO RECEIVE A SHIFT SIGNAL

CROSS-REFERENCE TO RELATED APPLICATION

This application claims priority under 35 U.S.C. § 119 from Japanese Patent Application No. 2019-054591 filed on Mar. 22, 2019. The entire subject matter of the application is incorporated herein by reference.

BACKGROUND

Technical Field

Aspects of the present disclosure are related to an optical scanning device, a laser diode driver, and an image forming apparatus having a shift register to receive a shift signal.

Related Art

Heretofore, an optical scanning device has been known that is configured to perform APC ("APC" is an abbreviation of "Automatic Power Control") to adjust respective quantities of light output from a plurality of laser diodes included in a semiconductor laser prior to causing the semiconductor laser to emit light based on image data. During execution of the APC, the optical scanning device may cause each of the plurality of laser diodes to emit light by transmitting a light emission signal from a controller to a corresponding driver circuit to drive each laser diode.

SUMMARY

To perform the APC, the optical scanning device is required to cause each laser diode to individually emit light. Therefore, in the optical scanning device, the number of signal lines for transmitting the light emission signal from the controller to the driver circuits is equal to the number of the laser diodes. Consequently, there is a problem that the optical scanning device has a large number of signal lines laid from the controller.

Aspects of the present disclosure are advantageous to provide one or more improved techniques for an optical scanning device to have a smaller number of signal lines laid from a controller to cause each of light emitting elements to individually emit light.

According to aspects of the present disclosure, an optical scanning device is provided, which includes a controller, and a scanning unit connected with the controller via a signal line. The scanning unit includes a semiconductor laser including N light emitting elements, N being a natural number equal to or more than two, an optical system configured to convert light emitted by each of the N light emitting elements into a beam, a deflector configured to deflect the beam received through the optical system, and a shift register including a plurality of output terminals each configured to output a light emission signal for controlling light emission from a corresponding one of the N light emitting elements, and an input terminal configured to receive a shift signal from the controller via the signal line. The shift register is configured to, each time receiving the shift signal from the controller via the input terminal, shift a specific output terminal from one output terminal to another in sequence among the plurality of output terminals and output the light emission signal via the specific output terminal, thereby controlling light emission from each of the N light emitting elements.

According to aspects of the present disclosure, further provided is a laser diode driver including a plurality of light emission control terminals each connected with a corresponding one of N light emitting elements of a semiconductor laser, N being a natural number equal to or more than two, a detection signal receiving terminal configured to receive a detection signal output from an optical sensor of the semiconductor laser, and a shift register including a plurality of output ports each configured to output a light emission signal for controlling light emission from a corresponding one of the N light emitting elements, and an input port configured to receive a shift signal. The shift register is configured to, each time receiving the shift signal via the input port, shift a specific output port from one output port to another in sequence among the plurality of output ports and output the light emission signal via the specific output port. Each of the plurality of light emission control terminals is configured to switch a state of the corresponding light emitting element between a light emitting state and a turned-off state, based on the light emission signal received from a corresponding one of the plurality of output ports of the shift register.

According to aspects of the present disclosure, further provided is an image forming apparatus including a photoconductive body, a controller, and a scanning unit connected with the controller via a signal line. The scanning unit includes a semiconductor laser including N light emitting elements, N being a natural number equal to or more than two, an optical system configured to convert light emitted by each of the N light emitting elements into a beam, a deflector configured to deflect the beam received through the optical system, and a shift register including a plurality of output interfaces each configured to output a light emission signal for controlling light emission from a corresponding one of the N light emitting elements, and an input interface configured to receive a shift signal from the controller via the signal line. The shift register is configured to, each time receiving the shift signal from the controller via the input interface, shift a specific output interface from one output interface to another in sequence among the plurality of output interfaces and output the light emission signal via the specific output interface, thereby controlling light emission from each of the N light emitting elements.

BRIEF DESCRIPTION OF THE ACCOMPANYING DRAWINGS

Figure 5:
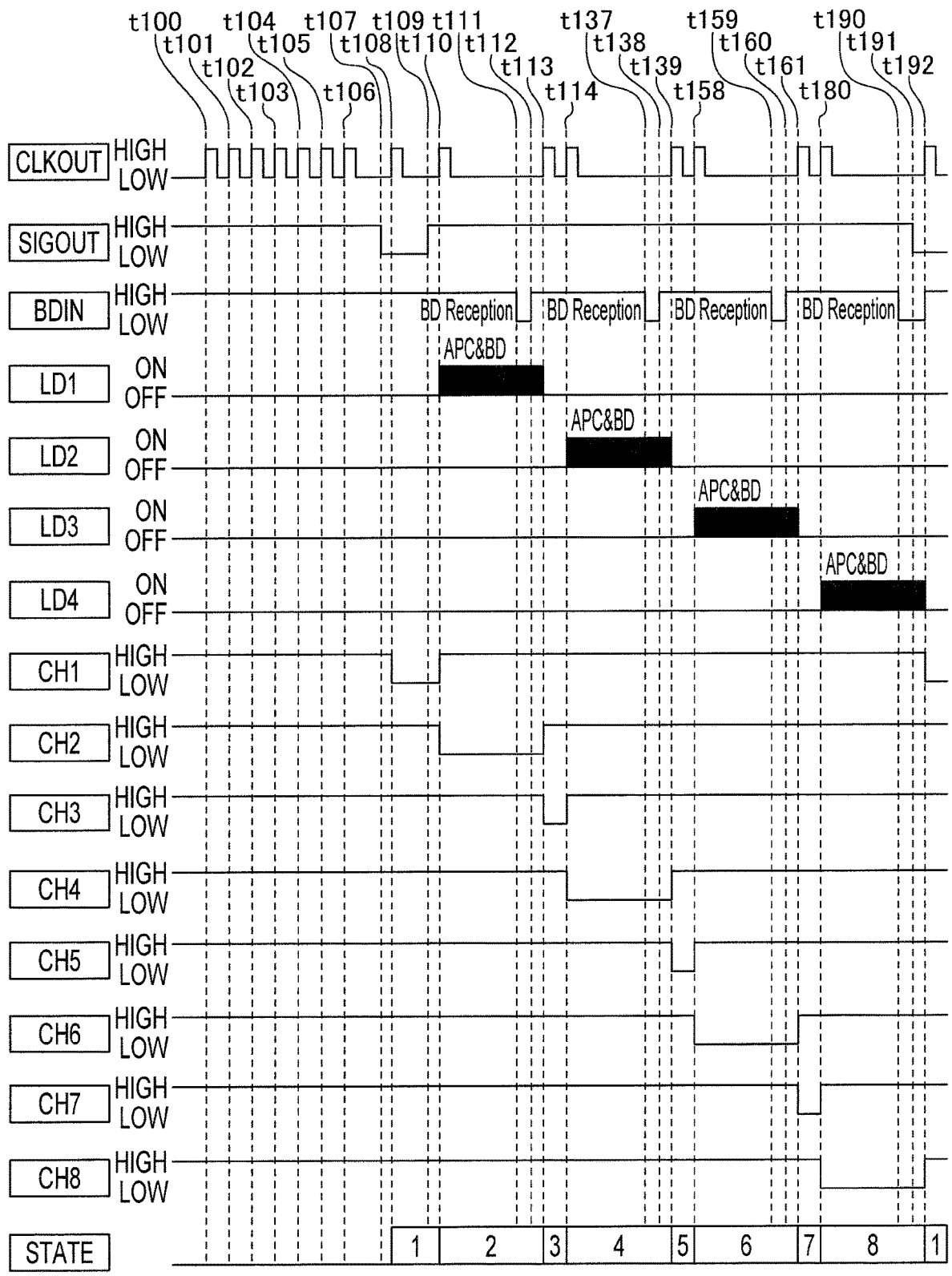

FIG. 5 is a time chart, in a start process to be performed by the exposure device when the printer starts printing, showing a behavior of a shift signal output from a CLKOUT terminal, a behavior of an electric potential of a signal line SI extending from a SIGOUT terminal, a behavior of an electric potential of a connection line CL connected to a BDIN terminal, a light emitting behavior of each light emitting element LD, a behavior of an output signal from each of CH1 to CH8 terminals of a shift register, and a state of the shift register, in the first illustrative embodiment according to one or more aspects of the present disclosure.

Figure 6:
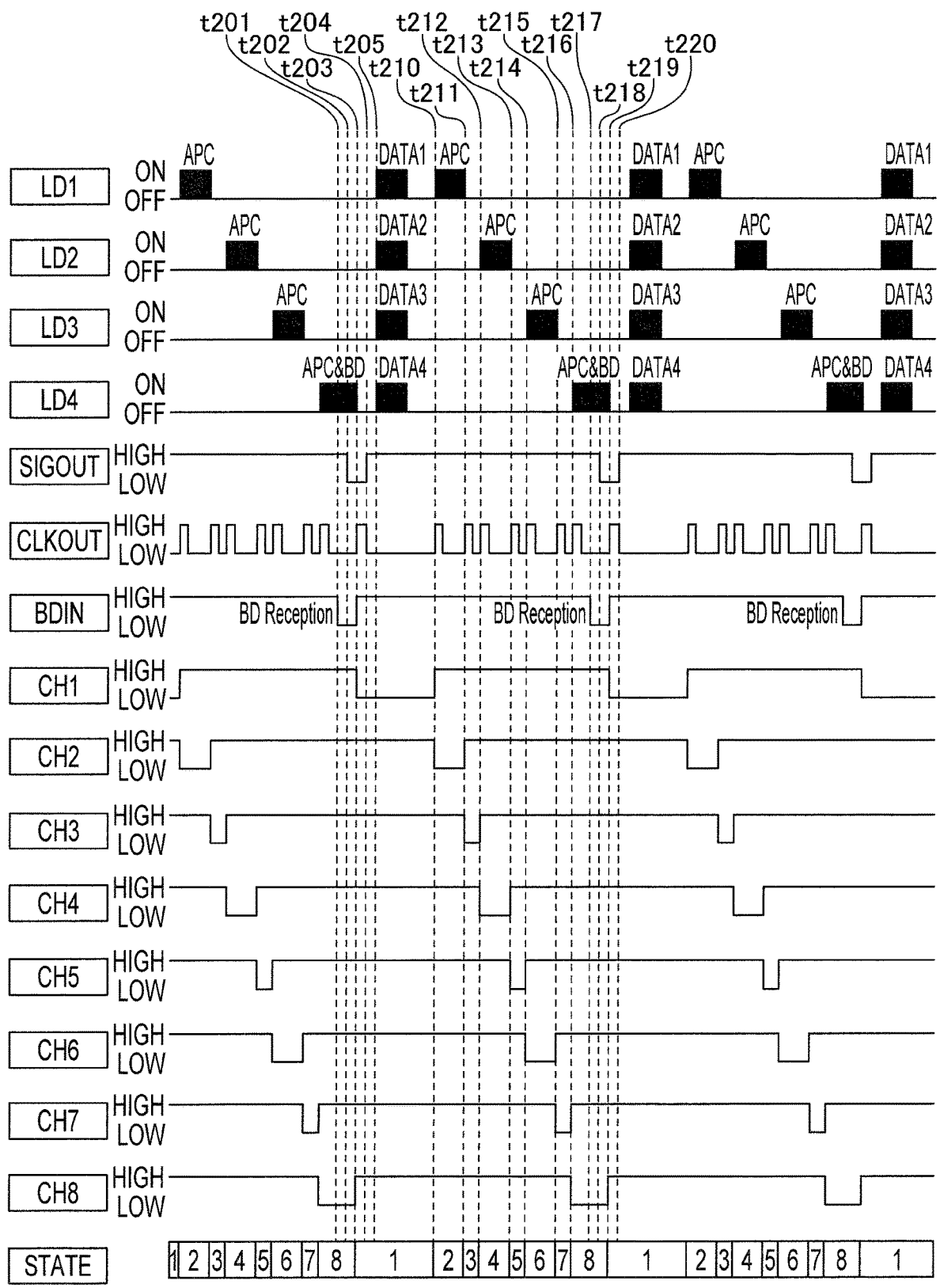

FIG. 6 is a time chart, in a printing process to be performed by the printer after completion of the start process, showing the light emitting behavior of each light emitting element LD, the behavior of the electric potential of the signal line SI extending from the SIGOUT terminal, the behavior of the shift signal output from the CLKOUT terminal, the behavior of the electric potential of the connection line CL connected to the BDIN terminal, the behavior of the output signal from each of the CH1 to CH8 terminals of the shift register, and the state of the shift register, in the first illustrative embodiment according to one or more aspects of the present disclosure.

FIG. 7 is a table showing associations among respective output levels (i.e., HIGH or LOW) of the CH1 to CH8 terminals in each state of the shift register, in the first illustrative embodiment according to one or more aspects of the present disclosure.

Figure 8:
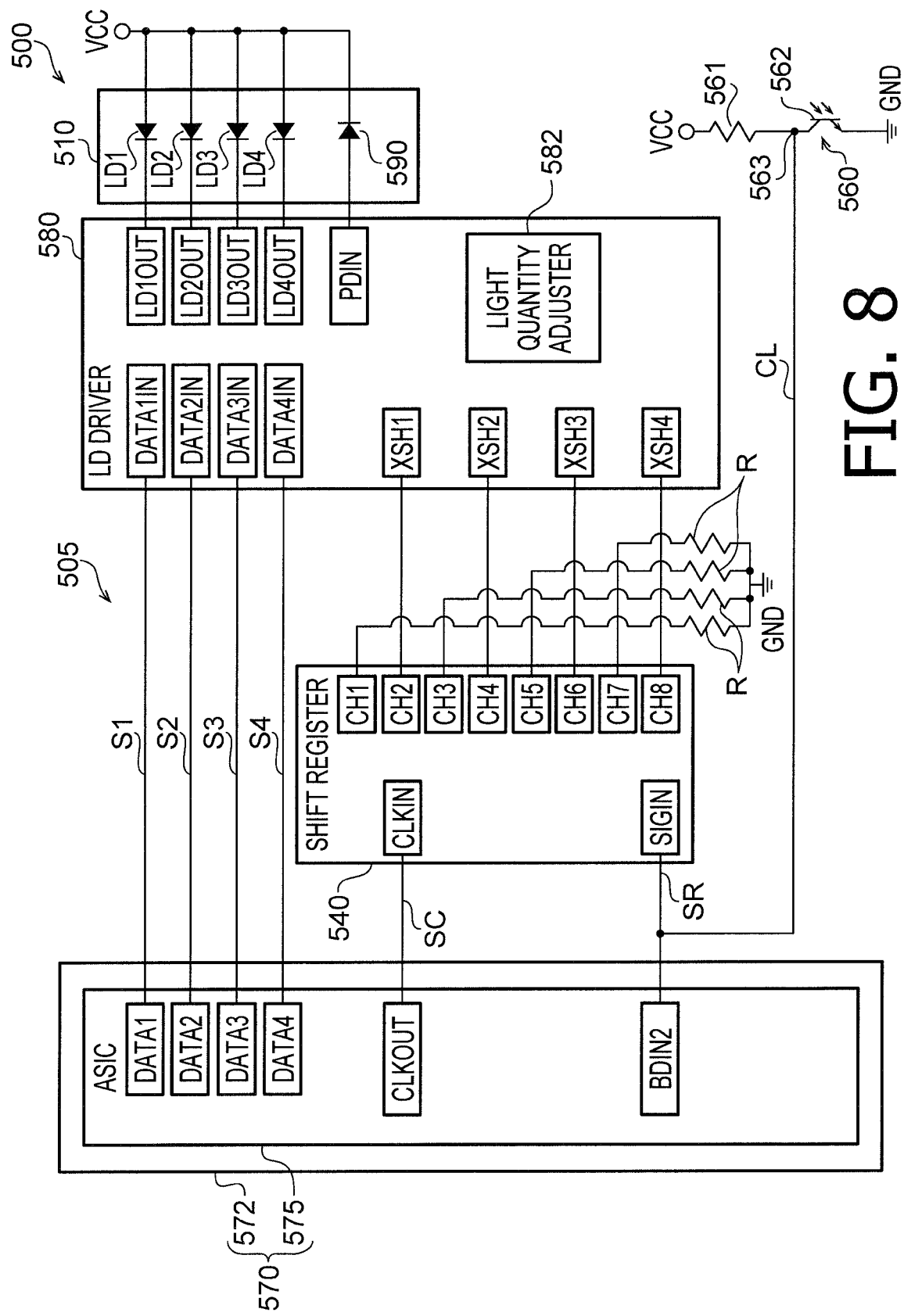

FIG. 8 is a block diagram schematically showing a circuit configuration of an exposure device in a second illustrative embodiment according to one or more aspects of the present disclosure.

Figure 9:
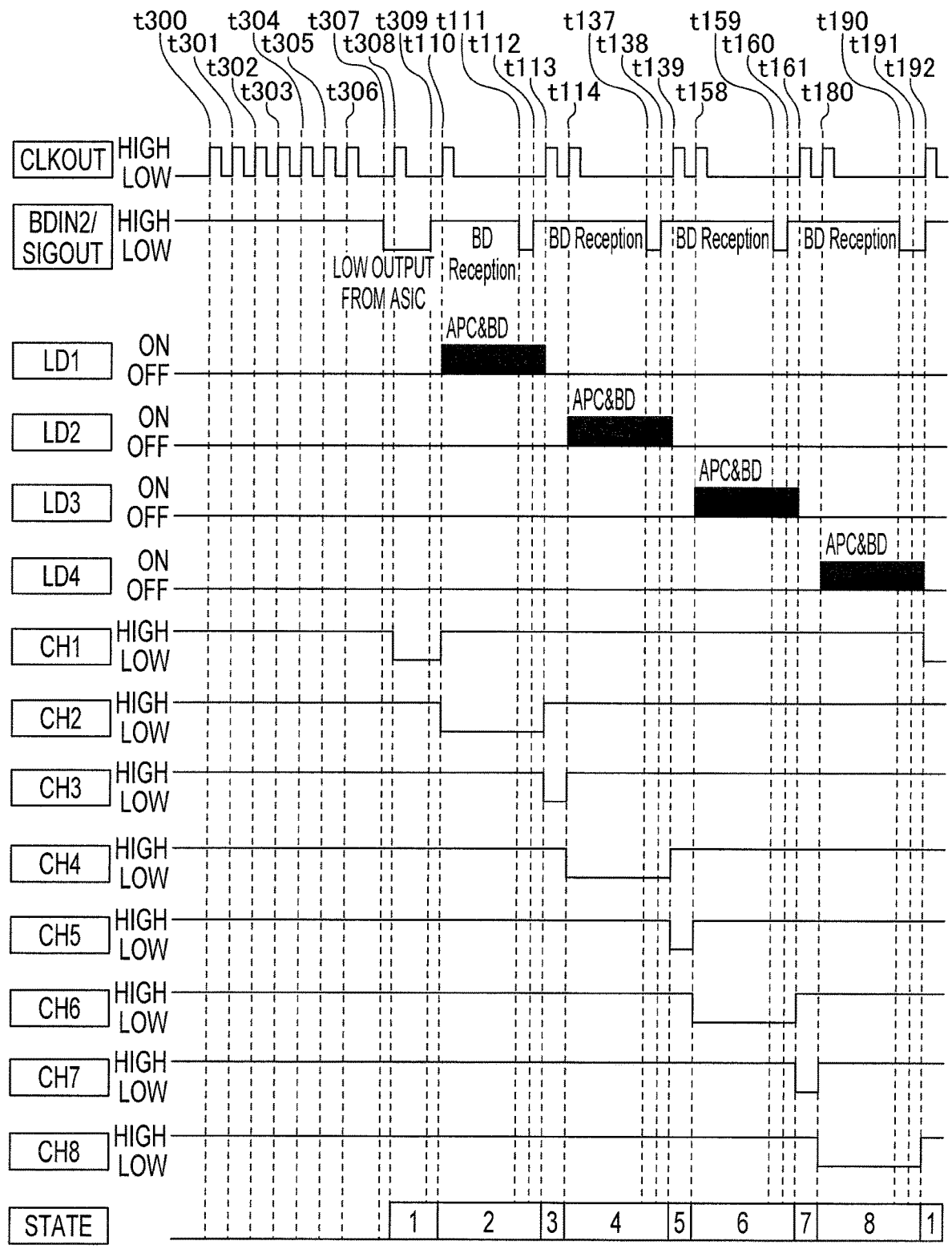

FIG. 9 is a time chart, in a start process to be performed by the exposure device when the printer starts printing, showing a behavior of a shift signal output from a CLKOUT terminal, a behavior of an electric potential of a signal line SR, a behavior of an electric potential of a connection line CL, a light emitting behavior of each light emitting element LD, a behavior of an output signal from each of CH1 to CH8 terminals of a shift register, and a state of the shift register, in the second illustrative embodiment according to one or more aspects of the present disclosure.

Figure 10:
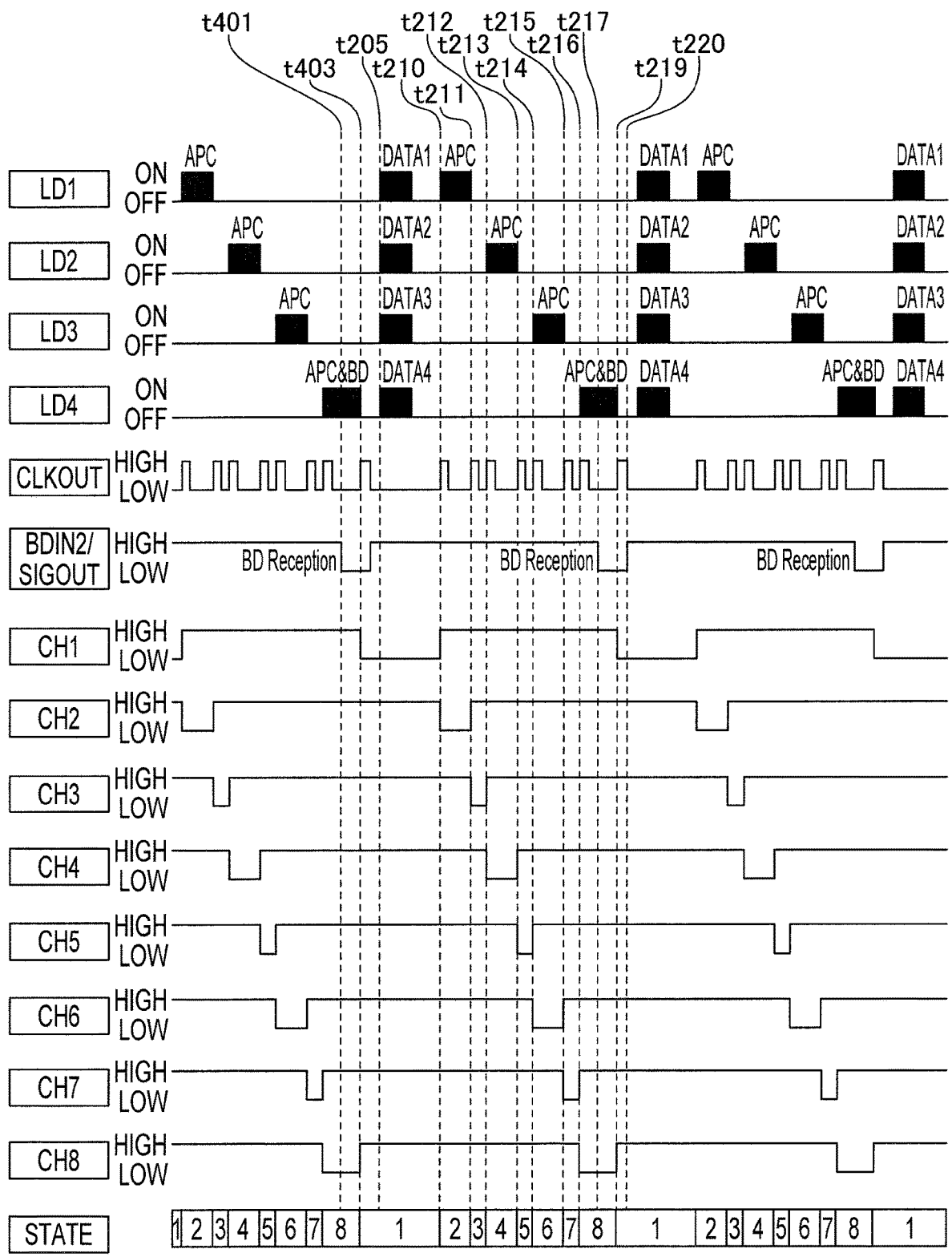

FIG. 10 is a time chart, in a printing process to be performed by the printer after completion of the start process, showing the light emitting behavior of each light emitting element LD, the behavior of the shift signal output from the CLKOUT terminal, the behavior of the electric potential of the signal line SR, the behavior of the output signal from each of the CH1 to CH8 terminals of the shift register, and the state of the shift register, in the second illustrative embodiment according to one or more aspects of the present disclosure.

Figure 11:
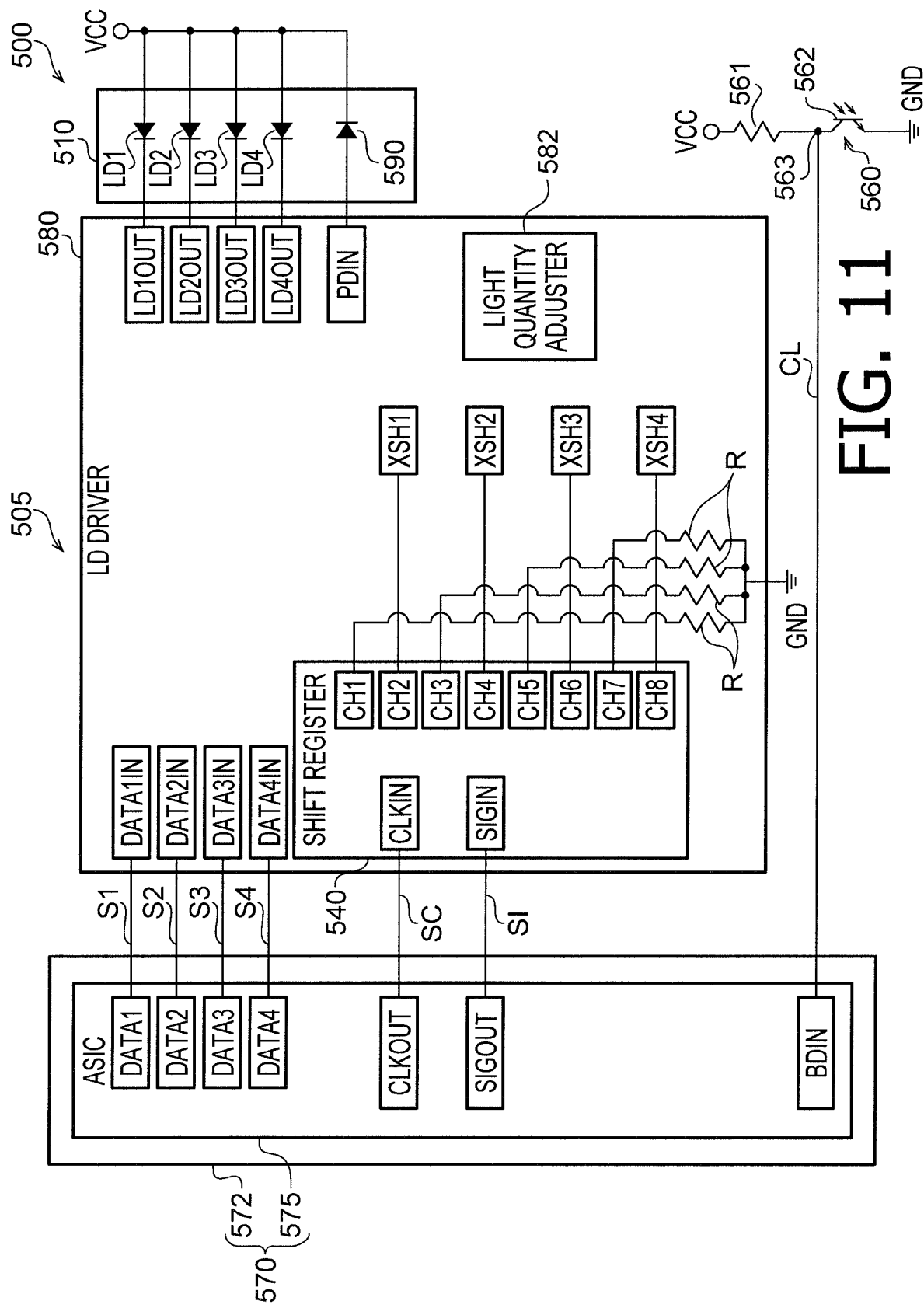

FIG. 11 is a block diagram schematically showing a circuit configuration of an exposure device in a modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, a first illustrative embodiment according to aspects of the present disclosure will be described with reference to the relevant drawings.

Figure 1:
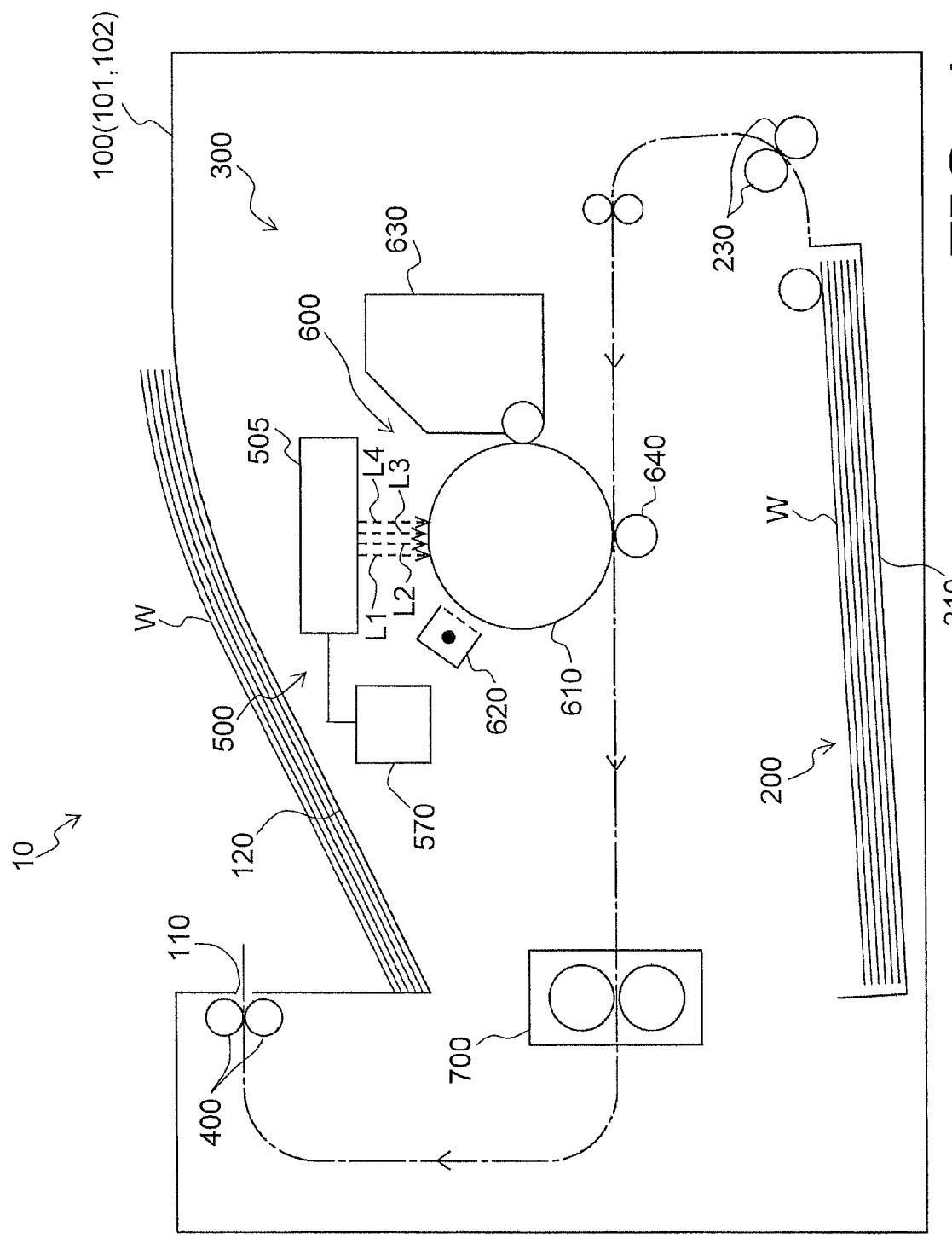
FIG. 1 is a cross-sectional side view schematically showing a configuration of a printer in a first illustrative embodiment according to one or more aspects of the present disclosure.

As shown in FIG. 1, a printer 10 is an electrophotographic image forming apparatus, and includes a housing 100. The housing 100 includes a support frame 101 and an exterior 102 to cover the support frame 101. The support frame 101 supports a sheet feeder 200, a printer engine 300, discharge rollers 400.

The sheet feeder 200 includes a tray 210 and conveyance rollers 230. Each of sheets W placed in the tray 210 are conveyed by the conveyance rollers 230 and delivered to the printer engine 300 at particular timing.

The printer engine 300 includes an exposure device 500, a process unit 600, and a fuser 700.

The exposure device 500 is a multi-beam scanning device configured to emit first laser light L1, second laser light L2, third laser light L3, and fourth laser light L4. The exposure device 500 may irradiate a photoconductive body 610 with the first to fourth laser lights L1 to L4, thereby simultaneously forming four line-shaped electrostatic latent images on a photoconductive body 610. It is noted that hereinafter, the first to fourth laser lights L1 to L4 may be collectively and simply referred to as the "laser light L." A configuration of the exposure device 500 will be described in detail later.

The process unit 600 includes the photoconductive body 610, a charger 620, a development section 630, and a transfer roller 640. The charger 620 is configured to evenly charge a surface of the photoconductive body 610. When the evenly-charged surface of the photoconductive body 610 is irradiated with the first to fourth laser lights L1 to L4 from the exposure device 500, electrostatic latent images are formed on the surface of the photoconductive body 610. The development section 630 develops the electrostatic latent images formed on the photoconductive body 610 by supplying developer to the electrostatic latent images. Thus, developer images are formed on the surface of the photoconductive body 610. The transfer roller 640 is disposed to face the photoconductive body 610. The transfer roller 640 transfers the developer images formed on the surface of the photoconductive body 610 onto a sheet W being conveyed by the sheet feeder 200.

The fuser 700 thermally fixes the developer images onto the sheet W. Afterward, the sheet W is discharged onto a discharge tray 120 via a discharge port 110 by the discharge rollers 400.

Figure 2:
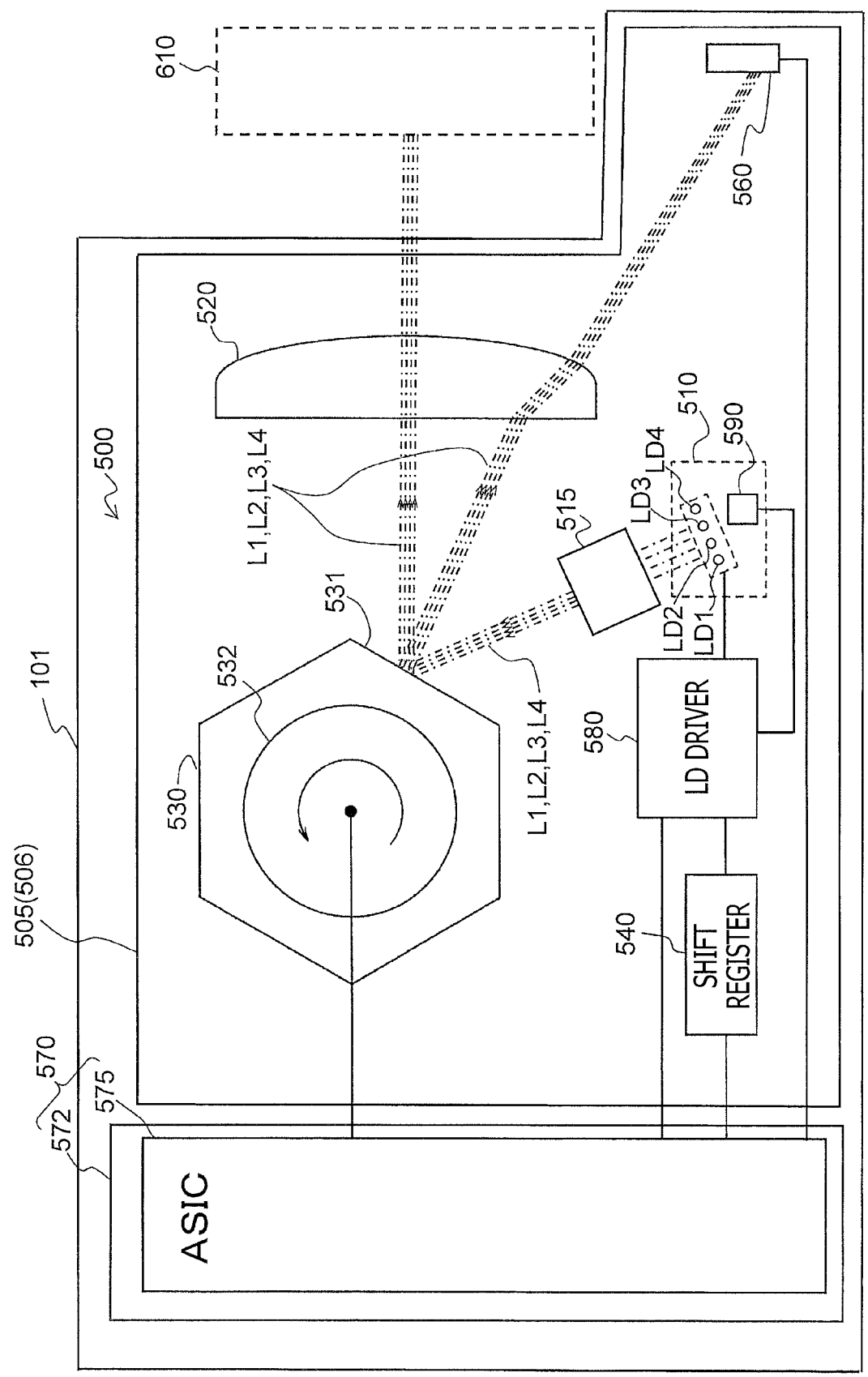
FIG. 2 is a plan view schematically showing a configuration of a scanning unit of the printer in the first illustrative embodiment according to one or more aspects of the present disclosure.

As shown in FIG. 2, the exposure device 500 includes a scanning unit 505 and a controller 570. The controller 570 includes a board 572 and an application specific integrated circuit (hereinafter referred to as an "ASIC") 575 mounted on the board 572. The controller 570 (more specifically in the example shown in FIG. 2, the board 572) is supported by the support frame 101.

The scanning unit 505 includes a multi beam laser 510. The scanning unit 505 is supported by the support frame 101.

Figure 3:
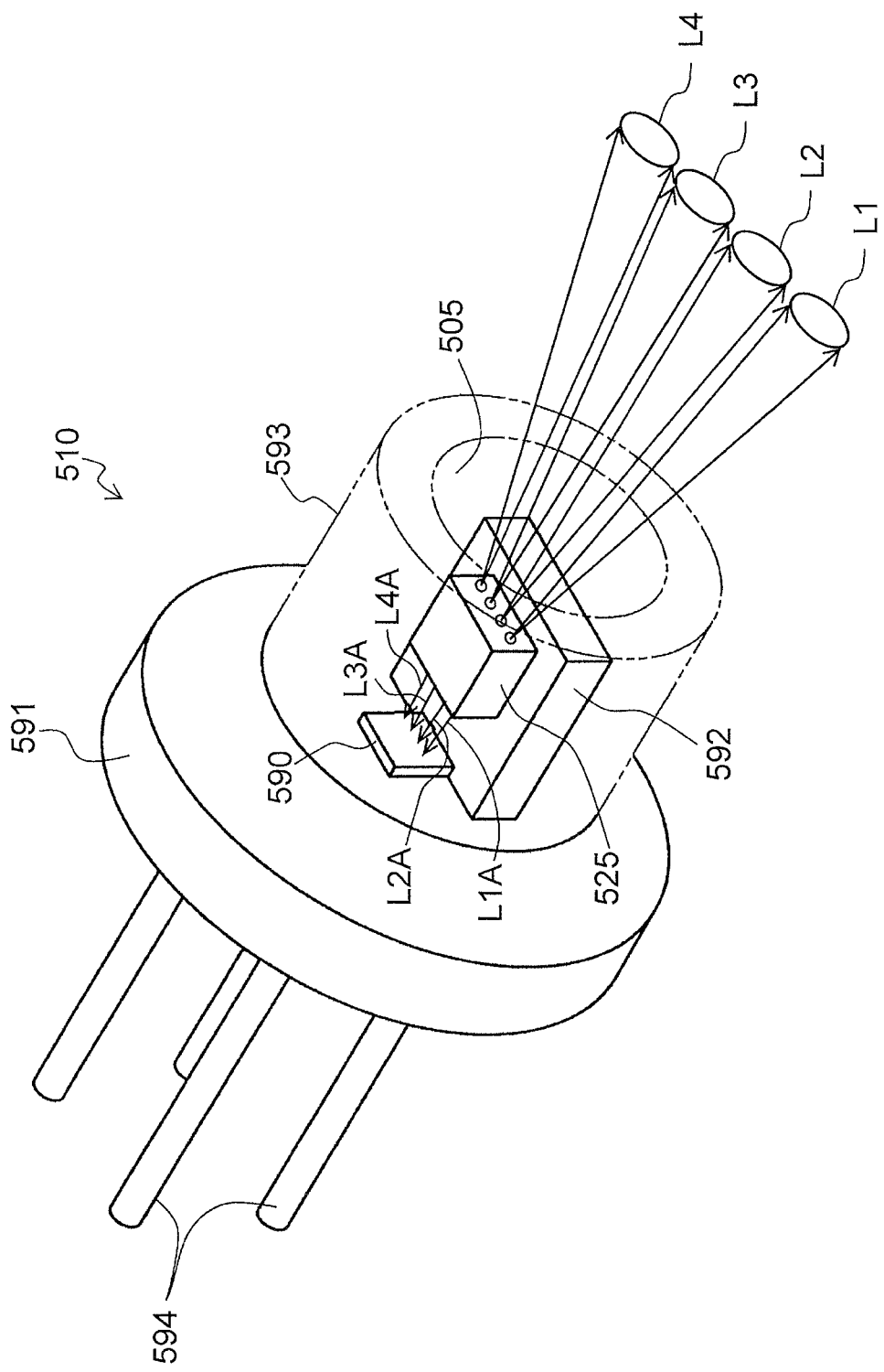
FIG. 3 is a perspective view schematically showing a configuration of a multi beam laser of the printer in the first illustrative embodiment according to one or more aspects of the present disclosure.

As shown in FIG. 3, the multi beam laser 510 includes a semiconductor laser array 525, an optical sensor 590, a stem 591, a base 592, a cap 593, and a plurality of connection terminals 594.

The semiconductor laser array 525 is mounted on the base 592. The semiconductor laser array 525 includes N light emitting elements ("N" represents a natural number equal to or more than two). In the example shown in FIG. 3, N is equal to 4. Namely, a first light emitting element LD1, a second light emitting element LD2, a third light emitting element LD3, and a fourth light emitting element LD4 are on a single semiconductor substrate. It is noted that hereinafter, the first to fourth light emitting elements LD1 to LD4 may be collectively and simply referred to as the "light emitting elements LD." The light emitting elements LD are configured to individually emit laser light in a light emitting direction.

The first light emitting element LD1 is configured to emit the first laser light L1 from an end face of the semiconductor substrate that is farther from the stem 591 than the other end face of the semiconductor substrate in the light emitting direction. Hereinafter, the end face, farther from the stem 591, of the semiconductor substrate may be referred to as a "front face." Further, the first light emitting element LD1 is configured to emit first back laser light L1A from the end face of the semiconductor substrate that is closer to the stem 591 than the front face in the light emitting direction. Hereinafter, the end face, closer to the stem 591, of the semiconductor substrate may be referred to as a "rear face." The second light emitting element LD2 is configured to emit the second laser light L2 from the front face of the semiconductor substrate and emit second back laser light L2A from the rear face of the semiconductor substrate. The third light emitting element LD3 is configured to emit the third laser light L3 from the front face of the semiconductor substrate and emit third back laser light L3A from the rear face of the semiconductor substrate. The fourth light emitting element LD4 is configured to emit the fourth laser light L4 from the front face of the semiconductor substrate and emit fourth back laser light L2A from the rear face of the semiconductor substrate. It is noted that hereinafter, the first to fourth back laser lights L1A to L4A may be collectively and simply referred to as the "back laser light LA." The first to fourth light emitting elements LD1 to LD4 are disposed in such a manner that the first to fourth laser lights L1 to L4 are emitted onto respective positions arranged at intervals in a sub scanning direction (i.e., a rotational direction of the photoconductive body 610) on the photoconductive body 610.

The base 592, the cap 593, and the optical sensor 590 are disposed on a surface of the stem 591. The cap 593 has a window 595 formed in an end face thereof that is farther from the stem 591 than the other end face of the cap 593 in the light emitting direction. The window 595 is configured such that the first to fourth laser lights L1 to L4 are transmitted therethrough. For instance, the optical sensor 590 may be a photodiode. The optical sensor 590 is configured to receive the first to fourth back laser lights L1A to L4A from the first to fourth light emitting elements LD1 to LD4. The plurality of connection terminals 594 are disposed on an end face of the stem 591 that is opposite to the other end face of the stem 591 on which the base 592 is disposed, in the light emitting direction. The plurality of connection terminals 594 are connected with a below-mentioned controller 570 and a below-mentioned power supply line VCC.

Referring back to FIG. 2, the scanning unit 505 includes a first lens section 515, a polygon mirror 530, a motor 532, a second lens section 520, a beam detector 560. A sift register 540 and a laser diode driver (hereinafter referred to as an "LD driver") 580 will be described later.

The first lens section 515 includes a collimating lens. The first lens section 515 is configured to convert the first to fourth laser lights L1 to L4 from the first to fourth light emitting elements LD1 to LD4 into respective beams directed toward the polygon mirror 530.

The polygon mirror 530 is a rotary polygon mirror having six reflecting surfaces 531 arranged in such a manner as to form side surfaces of a regular hexagonal column. The polygon mirror 530 is driven to rotate by the motor 532 controlled by the controller 570. The polygon mirror 530 is configured to deflect and scan the beams from the first lens section 515.

The second lens section 520 is a scanning optical system including an fθ lens. The second lens section 520 is configured to converge, on the surface of the photoconductive body 610, the respective beams of the first to fourth laser lights L1 to L4 emitted via the first lens section 515 and reflected by the reflecting surfaces 531 of the polygon mirror 530.

When the polygon mirror 530 is driven to rotate by the motor 532, an angle of a light receiving one of the reflecting surfaces 531 relative to the light emitting direction of the first to fourth laser lights L1 to L4 emitted via the first lens section 515 periodically varies. Consequently, the first to fourth laser lights L1 to L4 are periodically deflected by the reflecting surfaces 531. Thereby, four scanning lines are formed by the respective beams of the first to fourth laser lights L1 to L4.

The beam detector 560 is configured to receive the respective beams of the first to fourth laser lights L1 to L4 emitted via the first lens section 515 and reflected by the reflecting surfaces 531 when the angle of the light receiving one of the reflecting surfaces 531 relative to the light emitting direction is a particular angle.

The multi beam laser 510, the first lens section 515, the polygon mirror 530, the motor 532, the second lens section 520, and the beam detector 560 are held by an optical frame 506, together with the LD driver 580 and the shift register 540. The optical frame 506 is supported by the support frame 101.

Figure 4:
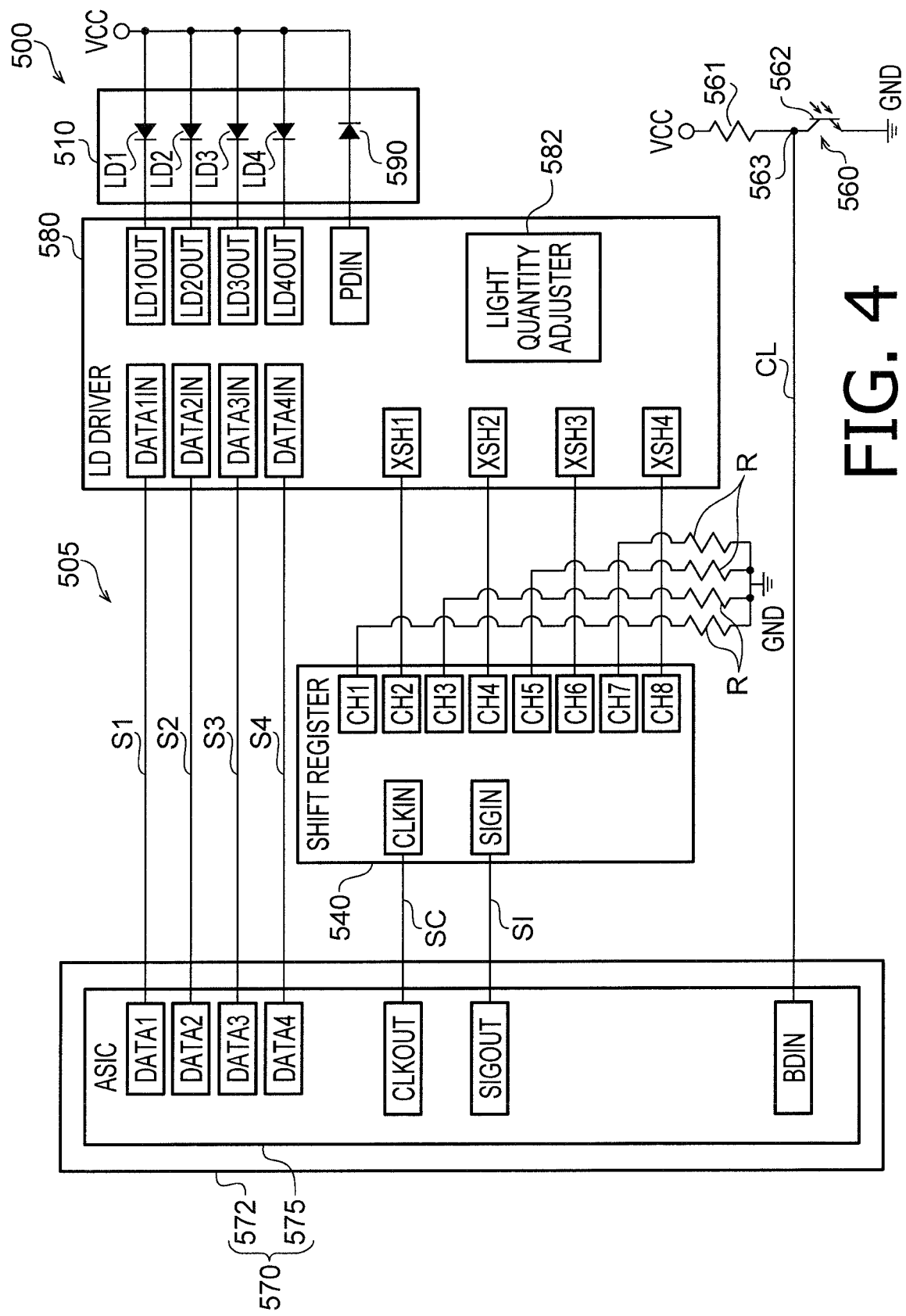
FIG. 4 is a block diagram schematically showing a circuit configuration of an exposure device of the printer in the first illustrative embodiment according to one or more aspects of the present disclosure.

FIG. 4 shows a configuration of circuits of the ASIC 575, the shift register 540, and the LD driver 580 included in the exposure device 500.

The LD driver 580 is configured to switch a state of each of the light emitting elements LD between a light emitting state and a turned-off state. Specifically, an anode of each of the light emitting elements LD is connected with the power supply line VCC. Cathodes of the first to fourth light emitting elements LD1 to LD4 are connected with an LD1OUT terminal, an LD2OUT terminal, an LD3OUT terminal, and an LD4OUT terminal of the LD driver 580, respectively. The LD driver 580 is configured to output a signal to the LD1OUT to LD4OUT terminals in a switching manner. A state of each of the LD1OUT to LD4OUT terminals is switched between an ON state and an OFF state by a voltage supplied from the power supply line VCC, based on a modulation signal according to a light emission signal or print data transmitted by the shift register 540. When one of the LD1OUT to LD4OUT terminals is in the ON state, a corresponding one of the light emitting elements LD is set to the light emitting state. Meanwhile, when one of the LD1OUT to LD4OUT terminals in the OFF state, a corresponding one of the light emitting elements LD is set to the turned-off state. It is noted that in the example shown in FIG. 4, the LD driver 580 is a stand-alone IC. Nonetheless, as will be described later with reference to FIG. 11, the LD driver 580 may be integrated with the shift register 540.

The LD driver 580 further includes a DATA1IN terminal, a DATA2IN terminal, a DATA3IN terminal, and a DATA4IN terminal provided for the first to fourth light emitting elements LD1 to LD4, respectively. It is noted that hereinafter, the DATA1IN terminal, the DATA2IN terminal, the DATA3IN terminal, and the DATA4IN terminal may be collectively and simply referred to as the "DATAIN terminals."

Further, the LD driver 580 functionally has a light quantity adjuster 582. The optical sensor 590 has a cathode connected with the power supply line VCC and an anode connected with a PDIN terminal of the LD driver 580. Thereby, a photocurrent Ip corresponding to a quantity of light received by the optical sensor 590 is generated and input into the LD driver 580 via the PDIN terminal. The light quantity adjuster 582 is configured to adjust a quantity of light emitted by each of the first to fourth light emitting elements LD1 to LD4 in such a manner that the photocurrent Ip corresponding to the quantity of light received by the optical sensor 590 is equal to a target value corresponding to a predetermined target light receiving quantity. In other words, the quantity of light emitted by each of the first to fourth light emitting elements LD1 to LD4 is adjusted by the light quantity adjuster 582 in such a manner that the quantity of light received by the optical sensor 590 is equal to the predetermined target light receiving quantity.

The LD driver 580 further includes light emission quantity adjusting signal input terminals XSH1, XSH2, XSH3, and XSH4 corresponding to the first to fourth light emitting elements LD1 to LD4, respectively. It is noted that hereinafter, the light emission quantity adjusting signal input terminals XSH1, XSH2, XSH3, and XSH4 may be collectively and simply referred to as the "XSH terminals." When an input signal into one of the XSH terminals is in a LOW state, the light quantity adjuster 582 adjusts the quantity of light emitted by a corresponding one of the light emitting elements LD. The LD driver 580 treats input signals (including input signals into the XSH terminals) and output signals in the LOW state as so-called ON signals, and treats input signals and output signals in the HIGH state as so-called OFF signals.

To adjust the light emission quantities as above, the first to fourth light emitting elements LD1 to LD4 need to be individually controlled to emit light. In the first illustrative embodiment, to cause each of the light emitting elements LD to individually emit light, the scanning unit 505 causes the ASIC 575 to output a shift signal to the shift register 540, thereby causing the shift register 540 to output a light emission signal for a corresponding one of the light emitting elements LD.

The shift register 540 has, on an input side thereof, a SIGIN terminal and a CLKIN terminal. The SIGIN terminal is connected with a SIGOUT terminal of the ASIC 575 via a signal line SI. The SIGIN terminal is configured to receive a signal output from the SIGOUT terminal of the ASIC 575 via the signal line SI. The CLKIN terminal is connected with a CLKOUT terminal of the ASIC 575 via a signal line SC. The CLKIN terminal is configured to receive the shift signal output from the CLKOUT terminal of the ASIC 575 via the signal line SC. Except for the shift signal, the shift register 540 treats input signals and output signals in the LOW state as ON signals, and treats input signals and output signals in the HIGH state as OFF signals. Regarding the shift signal, the shift register 540 treats input signals in the HIGH state as ON signals, and treats input signals in the LOW state as OFF signals.

In the example shown in FIG. 4, the shift register 540 is a stand-alone IC. Further, the shift register 540 has a plurality of terminals on the output side. Specifically, in the example shown in FIG. 4, the shift register 540 has 8 terminals including a CH1 terminal, a CH2 terminal, a CH3 terminal, a CH4 terminal, a CH5 terminal, a CH6 terminal, a CH7 terminal, and a CH8 terminal. Each of the CH1 terminal, the CH3 terminal, the CH5 terminal, and the CH7 terminal is grounded through a resistor R. The CH2 terminal is connected with the XSH1 terminal of the LD driver 580. The CH4 terminal is connected with the XSH2 terminal of the LD driver 580. The CH6 terminal is connected with the XSH3 terminal of the LD driver 580. The CH8 terminal is connected with the XSH4 terminal of the LD driver 580.

The shift register 540 is configured to, each time receiving the shift signal from the ASIC 575, shift a specific terminal from one terminal to another in sequence among the CH1 to CH8 terminals and output a signal input into the SIGIN terminal via the specific terminal. Namely, when the shift signal is input into the shift register 540, each of the CH2 to CH8 terminals is brought into the same output state as the output state, before the shift signal is input, of a previous terminal in an order (hereinafter referred to as a "reference numeral order") of the reference numerals assigned to the CH1 to CH8 terminals. Further, when the shift signal is input into the shift register 540, the CH1 terminal is brought into the same output state as the input state of the SIGIN terminal at the time when the shift signal is input.

The CH2 terminal, the CH4 terminal, the CH6 terminal, and the CH8 terminal connected with the LD driver 580 correspond to the LD1OUT terminal, the LD2OUT terminal, the LD3OUT terminal, and the LD4OUT terminal of the LD driver 580, respectively. Namely, when a signal in the LOW state is input into the XSH1 terminal, the LD1OUT terminal is brought into the ON state, and the quantity of light emitted by the first light emitting element LD1 is adjusted. When a signal in the LOW state is input into the XSH2 terminal, the LD2OUT terminal is brought into the ON state, and the quantity of light emitted by the second light emitting element LD2 is adjusted. When a signal in the LOW state is input into the XSH3 terminal, the LD3OUT terminal is brought into the ON state, and the quantity of light emitted by the third light emitting element LD3 is adjusted. When a signal in the LOW state is input into the XSH4 terminal, the LD4OUT terminal is brought into the ON state, and the quantity of light emitted by the fourth light emitting element LD4 is adjusted.

When the shift register 540 puts one of the CH2, CH4, CH6, and CH8 terminals into the LOW output state where the light emission signal is output therefrom, a corresponding one of the XSH1, XSH2, XSH3, and XSH4 terminals of the LD driver 580 is brought into the LOW input state. Thereby, a corresponding one of the LD1OUT, LD2OUT, LD3OUT, and LD4OUT terminals is brought into the ON state, and the quantity of light emitted by a corresponding one of the first to fourth light emitting elements LD1 to LD4 is adjusted. Consequently, each of the first to fourth light emitting elements LD1 to LD4 emits light. When the CH2, CH4, CH6, and CH8 terminals are in the HIGH output state, the light quantity adjustment is not performed.

The shift register 540 is configured to, each time receiving the shift signal output from the CLKOUT terminal of the ASIC 575, shift an output from each of the CH1 to CH8 terminals one by one in the reference numeral order of the CH1 to CH8 terminals. When receiving the shift signal output from the CLKOUT terminal of the ASIC 575 with the SIGOUT terminal of the ASIC 575 being in the HIGH output state, the shift register 540 puts the CH1 terminal into the HIGH output state. Thus, when receiving seven or more shift signals output from the CLKOUT terminal with the SIGOUT terminal of the ASIC 575 being in the HIGH output state, all of the CH1 to CH7 terminals are brought into the HIGH output state. In this situation, when the SIGOUT terminal of the ASIC 575 is brought into the LOW output state, and the shift register 540 receives the shift signal output from the CLKOUT terminal, the CH1 terminal is brought into the LOW output state, and the other terminals (i.e., the CH2 to CH8 terminals) are put in the HIGH output state. This state is defined as an initial state of the shift register 540.

Namely, in the initial state, the CH1 terminal is in the LOW output state, and the other terminals are in the HIGH output state.

In the initial state, when the shift signal is input into the shift register 540 with the SIGOUT terminal of the ASIC 575 being in the HIGH output state, the output from each of the CH1 to CH7 terminals is shifted by one in the reference numeral order of the CH1 to CH8 terminals. Specifically, the CH2 terminal is brought into the LOW output state. Since the SIGOUT terminal of the ASIC 575 is in the HIGH output state, the CH1 terminal is brought into the HIGH output state, and the CH3 to CH8 terminals are also in the HIGH output state. In response to the CH2 terminal being brought into the LOW output state, the first light emitting element LD1 is turned on to emit light. When the shift signal is input into the shift register 540 with the CH2 terminal being in the LOW output state, the output from each of the CH1 to CH7 terminals is further shifted by one in the reference numeral order of the CH1 to CH8 terminals. Thereby, the CH3 terminal is only in the LOW output state, and the CH1, CH2, and CH4 to CH8 terminals are in the HIGH output state. In response to the CH2 terminal being brought into the HIGH output state, the first light emitting element LD1 is turned off.

When the shift signal is input into the shift register 540 with the CH3 terminal being in the LOW output state, the output from each of the CH1 to CH7 terminals is further shifted by one in the reference numeral order of the CH1 to CH8 terminals. Thereby, the CH4 terminal is only in the LOW output state, and the CH1 to CH3 and CH5 to CH8 terminals are in the HIGH output state. In response to the CH4 terminal being brought into the LOW output state, the second light emitting element LD2 is turned on to emit light. When the shift signal is input into the shift register 540 with the CH4 terminal being in the LOW output state, the output from each of the CH1 to CH7 terminals is further shifted by one in the reference numeral order of the CH1 to CH8 terminals. Thereby, the CH5 terminal is only in the LOW output state, and the CH1 to CH4 and CH6 to CH8 terminals are in the HIGH output state. In response to the CH4 terminal being brought into the HIGH output state, the second light emitting element LD2 is turned off.

When the shift signal is further input into the shift register 540 with the CH5 terminal being in the LOW output state, the output from each of the CH1 to CH7 terminals is further shifted by one in the reference numeral order of the CH1 to CH8 terminals. Thereby, the CH6 terminal is only in the LOW output state, and the CH1 to CH5, CH7, and CH8 terminals are in the HIGH output state. In response to the CH6 terminal being brought into the LOW output state, the third light emitting element LD3 is turned on to emit light. When the shift signal is input into the shift register 540 with the CH6 terminal being in the LOW output state, the output from each of the CH1 to CH7 terminals is further shifted by one in the reference numeral order of the CH1 to CH8 terminals. Thereby, the CH7 terminal is only in the LOW output state, and the CH1 to CH6 and CH8 terminals are in the HIGH output state. In response to the CH6 terminal being brought into the HIGH output state, the third emitting element LD3 is turned off.

When the shift signal is further input into the shift register 540 with the CH7 terminal being in the LOW output state, the output from each of the CH1 to CH7 terminals is further shifted by one in the reference numeral order of the CH1 to CH8 terminals. Thereby, the CH8 terminal is only in the LOW output state, and the CH1 to CH7 terminals are in the HIGH output state. In response to the CH8 terminal being brought into the LOW output state, the third light emitting element LD4 is turned on to emit light. When the shift signal is input into the shift register 540 with the CH8 terminal being in the LOW output state, the output from each of the CH1 to CH7 terminals is further shifted by one in the reference numeral order of the CH1 to CH8 terminals. Thereby, the CH1 terminal is only in the LOW output state, and the CH2 to CH8 terminals are in the HIGH output state. In response to the CH8 terminal being brought into the HIGH output state, the third emitting element LD4 is turned off.

As described above, by receiving the shift signal, the shift register 540 outputs the light emission signal for each of the first to fourth light emitting elements LD1 to LD4.

The beam detector 560 includes a phototransistor 562. A collector of the phototransistor 562 is connected with the power supply line VCC via a resistor 561. An emitter 562 of the phototransistor 562 is grounded. A collector-side connection point 563 of the phototransistor 562 is connected with the ASIC 575 via a connection line CL.

While the beam detector 560 is not receiving the beam of the laser light L, the phototransistor 562 is in a non-conductive state. In this non-conductive state, an electric potential of the connection line CL is put in the HIGH state by a voltage of the power supply line VCC. When the beam detector 560 receives the beam of the laser light L, the phototransistor 562 is brought into a conductive state. In this conductive state, an electric current from the power supply line VCC flows from the collector to the emitter, and the electric potential of the connection line CL is put in the LOW state.

The ASIC 575 includes a BDIN terminal, a DATA1 terminal, a DATA2 terminal, a DATA3 terminal, and a DATA4 terminal, as well as the CLKOUT terminal and the SIGOUT terminal.

A detection signal from the beam detector 560 is input into the BDIN terminal via the connection line CL, and is used for the ASIC 575 to determine a timing to transmit an image signal. By determining a position to start drawing an image based on a timing at which light reaches the beam detector 560, it is possible to prevent positional misalignment of an image formed on the photoconductive body 610. Further, the output from the beam detector 560 is used for the ASIC 575 to check whether each light emitting element LD is normally emitting light. It is noted that hereinafter, checking by the ASIC 575 whether each light emitting element LD is normally emitting light may be simply referred to as "light emission checking."

The DATA1 terminal, the DATA2 terminal, the DATA3 terminal, and the DATA4 terminal are for transmitting the aforementioned modulation signals according to the print data to the DATA1IN terminal, the DATA2IN terminal, the DATA3IN terminal, and the DATA4IN terminal of the LD driver 580, respectively. The DATA1 to DATA4 terminals are associated with the LD1OUT to LD4OUT terminals via the DATA1IN to DATA4IN terminals of the LD driver 580, respectively.

The modulation signals from the DATA1 terminal, the DATA2 terminal, the DATA3 terminal, and the DATA4 terminal are transmitted to the DATA1IN terminal, the DATA2IN terminal, the DATA3IN terminal, and the DATA4IN terminal of the LD driver 580 via signal lines S1, S2, S3, and S4, respectively. Thereby, each of the LD1OUT to LD4OUT terminals is brought into the ON state or the OFF state in accordance with the corresponding modulation signal. Thus, the first to fourth light emitting elements LD1 to LD4 are driven to emit light in accordance with the image data. It is noted that each of the signal lines S1 to S4 is a data signal line.

As described above with reference to FIG. 4, in the exposure device 500, the ASIC 575 of the controller 570 is connected with the shift register 540 of the scanning unit 505 via the signal lines SC and SI. Further, the ASIC 575 is connected with the LD driver 580 of the scanning unit 505 via the signal lines S1, S2, S3, and S4. It is noted that the signal line SC is a shift signal line, and the signal line SI is an input signal line.

FIG. 5 is a time chart in a start process to be performed by the exposure device 500 when the printer 10 starts printing. Specifically, FIG. 5 shows a behavior of the shift signal output from the CLKOUT terminal, a behavior of the electric potential of the signal line SI extending from the SIGOUT terminal, a behavior of the electric potential of the connection line CL connected to the BDIN terminal, a light emitting behavior of each light emitting element LD, a behavior of the output signal from each of the CH1 to CH8 terminals of the shift register 540, and a state of the shift register 540.

First, it is required to bring the shift register 540 into the initial state prior to rotating the motor 532. Therefore, the SIGOUT terminal of the ASIC 575 is put in the HIGH output state. Further, at time t100, a pulse of the shift signal is output from the CLKOUT terminal of the ASIC 575 and input into the CLKIN terminal of the shift register 540. Thereby, the CH1 terminal of the shift register 540 is brought into the HIGH output state. Subsequently, at time t101, a pulse of the shift signal is output from the CLKOUT terminal of the ASIC 575 and input into the CLKIN terminal of the shift register 540. Thereby, the CH1 terminal and the CH2 terminal of the shift register 540 are brought into the HIGH output state. Next, at time t102, a pulse of the shift signal is output from the CLKOUT terminal of the ASIC 575 and input into the CLKIN terminal of the shift register 540. Thereby, the CH1 to CH3 terminals are brought into the HIGH output state. Likewise, at each timing of time t103, time t104, time t105, and time t106, a pulse of the shift signal is output from the CLKOUT terminal of the ASIC 575 and input into the CLKIN terminal of the shift register 540. Thereby, the CH1 to CH7 terminals of the shift register 540 are brought into the HIGH output state. Subsequently, at time t107, the SIGOUT terminal of the ASIC 575 is brought into the LOW output state. Afterward, at time t108, a pulse of the shift signal is output from the CLKOUT terminal of the ASIC 575 and input into the CLKIN terminal of the shift register 540. Thereby, the shift register 540 is set to the aforementioned initial state where the CH1 terminal is in the LOW output state, and the CH2 to CH8 terminals are in the HIGH output state. It is noted that the initial state of the shift register 540 may be referred to as a state "1." Thereafter, at time t109, the SIGOUT terminal of the ASIC 575 is restored to the HIGH output state.

Afterward, before time t110, the motor 532 is driven to rotate the polygon mirror 530. At the time t110, a pulse of the shift signal output from the CLKOUT terminal of the ASIC 575 is input into the CLKIN terminal of the shift register 540. Thereby, the terminal in the LOW output state among the CH1 to CH8 terminals is shifted from the CH1 terminal to the CH2 terminal. Consequently, the first light emitting element LD1 is turned on to emit light. Further, since the SIGOUT terminal is in the HIGH output state, the CH1 terminal is brought into the HIGH output state. Thus, the shift register 540 comes into a state "2." It is noted that in FIG. 5, a state where each light emitting element LD is turned on to emit light is simply shown as "ON." Further, a state where each light emitting element LD is turned off is simply shown as "OFF." As will be shown later, the same applies to FIG. 6. After the first light emitting element LD1 is turned on to emit light, the quantity of light emitted by the first light emitting element LD1 is adjusted based on the quantity of the first back laser light L1A received by the optical sensor 590. It is noted that in FIG. 5, execution of the above light emission quantity adjustment is simply shown as "APC" ("APC" is an abbreviation of "Automatic Power Control"). As will be shown later, the same applies to FIG. 6.

At and after the time t110, the beam detector 560 is put in a light reception waiting state to wait until receiving the beam of the first laser light L1. At time t111, the beam detector 560 receives the beam of the first laser light L1. Thereby, at this time, a detection signal (hereinafter, which may be referred to as a "BD signal") from the beam detector 560 to bring the electric potential of the signal line SI into the LOW state is input into the BDIN terminal of the ASIC 575. It is noted that in FIG. 5, the input of the detection signal from the beam detector 560 which has received the beam is simply shown as "BD" or "BD Reception." As will be shown later, the same applies to FIG. 6. The beam of the first laser light L1 passes through the beam detector 560, and the BD signal is restored to the HIGH state at time t112. Thereafter, at time t113, a pulse of the shift signal is output from the CLKOUT terminal of the ASIC 575 and input into the CLKIN terminal of the shift register 540. Thereby, the shift register 540 is brought into a state "3." In the state "3," the terminal in the LOW output state among the CH1 to CH8 terminals is shifted from the CH2 terminal to the CH3 terminal, and the first light emitting element LD1 is turned off.

Afterward, at time t114, a pulse of the shift signal is output from the CLKOUT terminal of the ASIC 575 and input into the CLKIN terminal of the shift register 540. Thereby, the shift register 540 is brought into a state "4." In the state "4," the terminal in the LOW output state among the CH1 to CH8 terminals is shifted from the CH3 terminal to the CH4 terminal, and the second light emitting element LD2 is turned on to emit light. Then, the quantity of light emitted by the second light emitting element LD2 is adjusted based on the quantity of the second back laser light L2A received by the optical sensor 590. Further, in substantially the same manner as the light emission checking for the first light emitting element LD1, the beam detector 560 is put in the light reception waiting state to wait until receiving the beam of the second laser light L2. At time t137, the beam detector 560 receives the beam of the second laser light L2, and a detection signal from the beam detector 560 is input into the BDIN terminal of the ASIC 575. The beam of the second laser light L2 passes through the beam detector 560, and the BD signal is restored to the HIGH state at time t138. Thereafter, at time t139, a pulse of the shift signal is output from the CLKOUT terminal of the ASIC 575 and input into the CLKIN terminal of the shift register 540. Thereby, the shift register 540 is brought into a state "5." In the state "5," the terminal in the LOW output state among the CH1 to CH8 terminals is shifted from the CH4 terminal to the CH5 terminal, and the second light emitting element LD2 is turned off.

Afterward, at time t158, a pulse of the shift signal is output from the CLKOUT terminal of the ASIC 575 and input into the CLKIN terminal of the shift register 540. Thereby, the shift register 540 is brought into a state "6." In the state "6," the terminal in the LOW output state among the CH1 to CH8 terminals is shifted from the CH5 terminal to the CH6 terminal, and the third light emitting element LD3 is turned on to emit light. Then, the quantity of light emitted by the third light emitting element LD3 is adjusted based on the quantity of the third back laser light L3A received by the optical sensor 590. Further, in substantially the same manner as the light emission checking for the first light emitting element LD1 and the second light emitting element LD2, the beam detector 560 is put in the light reception waiting state to wait until receiving the beam of the third laser light L3. At time t159, the beam detector 560 receives the beam of the third laser light L3, and a detection signal from the beam detector 560 is input into the BDIN terminal of the ASIC 575. The beam of the third laser light L3 passes through the beam detector 560, and the BD signal is restored to the HIGH state at time t160. Thereafter, at time t161, a pulse of the shift signal is output from the CLKOUT terminal of the ASIC 575 and input into the CLKIN terminal of the shift register 540. Thereby, the shift register 540 is brought into a state "7." In the state "7," the terminal in the LOW output state among the CH1 to CH8 terminals is shifted from the CH6 terminal to the CH7 terminal, and the third light emitting element LD3 is turned off.

Afterward, at time t180, a pulse of the shift signal is output from the CLKOUT terminal of the ASIC 575 and input into the CLKIN terminal of the shift register 540. Thereby, the shift register 540 is brought into a state "8." In the state "8," the terminal in the LOW output state among the CH1 to CH8 terminals is shifted from the CH7 terminal to the CH8 terminal, and the fourth light emitting element LD4 is turned on to emit light. Then, the quantity of light emitted by the fourth light emitting element LD4 is adjusted based on the quantity of the fourth back laser light L4A received by the optical sensor 590. Further, in substantially the same manner as the light emission checking for the first to third light emitting elements LD1 to LD3, the beam detector 560 is put in the light reception waiting state to wait until receiving the beam of the fourth laser light L4. At time t190, the beam detector 560 receives the beam of the fourth laser light L4, and a detection signal from the beam detector 560 is input into the BDIN terminal of the ASIC 575. At time t191, the SIGOUT terminal of the ASIC 575 is brought into the LOW output state. Thereafter, at time t192, a pulse of the shift signal is output from the CLKOUT terminal of the ASIC 575 and input into the CLKIN terminal of the shift register 540. Thereby, the shift register 540 is brought into the state "1" corresponding to the aforementioned initial state.

In response to the detection signal from the beam detector 560 being input into the BDIN terminal of the ASIC 575 at the time t190, the light emission checking is performed for the fourth light emission element LD4.

FIG. 7 is a table showing associations among respective output levels (i.e., HIGH or LOW) of the CH1 to CH8 terminals in each of the states "1" to "8" of the shift register 540.

As described above, during the start process by the exposure device 500, the ASIC 575 repeatedly sends a pulse of the shift signal to the shift register 540, thereby causing the shift register 540 to sequentially output the light emission signal for each of the N (in the example shown in FIG. 4, N=4) light emitting elements LD. The optical sensor 590 detects the quantity of light sequentially emitted by each of the four light emitting elements LD in response to the light emission signal from the shift register 540. The ASIC 575 causes the beam of the fourth laser light L4 emitted by the N-th one (in the example shown in FIG. 4, the fourth light emitting element LD4) of the N light emitting elements LD to be incident onto the beam detector 560 at the time t190. In particular, when the beam detector 560 receives the beam of the fourth laser light L4 emitted by the fourth light emitting element LD4, the ASIC 575 outputs a pulse of the shift signal, thereby bringing the shift register 540 back into the initial state. When the beam detector 560 receives the beam of the laser light emitted by the n-th one of the N light emitting elements LD, the shift register 540 outputs the light emission signal for the (n+1)-th one of the light emitting elements LD. It is noted that "n" is a natural number less than "N."

FIG. 6 is a time chart in a printing process to be performed by the printer 10 after completion of the aforementioned start process. Specifically, FIG. 6 shows the light emitting behavior of each light emitting element LD, the behavior of the electric potential of the signal line SI extending from the SIGOUT terminal, the behavior of the shift signal output from the CLKOUT terminal, the behavior of the electric potential of the connection line CL connected to the BDIN terminal, the behavior of the output signal from each of the CH1 to CH8 terminals of the shift register 540, and the state of the shift register 540.

After completion of the light emission quantity adjustment and the light emission checking for each of the N light emitting elements LD (in the first illustrative embodiment, the first to fourth light emitting elements LD1 to LD4) as shown in FIG. 5, the printer 10 performs a printing process to form an image based on the print data. In the printing process, the ASIC 575 transmits the modulation signals from the DATA1 to DATA4 terminals to the LD driver 580 in such a manner that each line begins at time t205 after a lapse of a particular time period from time t201 at which a detection signal from the beam detector 560 that has received the beam is input into the BDIN terminal of the ASIC 575. The modulation signals include image data for N lines each associated with a corresponding one of the N light emitting elements LD. Afterward, at time t202, the SIGOUT terminal of the ASIC 575 is brought into the LOW output state. Thereafter, at time t203, a single clock pulse of the shift signal is output from the CLKOUT terminal. Further, at time t204, the SIGOUT terminal is brought into the HIGH output state. Thereby, while the printer 10 is performing printing, the shift register 540 is put in the state "1" corresponding to the initial state. It is noted that in FIG. 6, the modulation signals corresponding to the print data are simply shown as "DATA."

After the image data for the N lines is transmitted from the time t205, at time t210, a pulse of the shift signal is output from the CLKOUT terminal of the ASIC 575 and input into the CLKIN terminal of the shift register 540. Thereby, in the same manner as described above, the shift register 540 is brought into the state "2" in which the CH2 terminal is in the LOW output state, and the first light emitting element LD1 is turned on to emit light. After the first light emitting element LD1 is turned on to emit light, the quantity of light emitted by the first light emitting element LD1 is adjusted based on the quantity of the first back laser light L1A received by the optical sensor 590. Then, at time t211, a pulse of the shift signal is output from the CLKOUT terminal of the ASIC 575 and input into the CLKIN terminal of the shift register 540. Thereby, the shift register 540 is brought into the state "3" in which the CH3 terminal is in the LOW output state. Thereby, the first light emitting element LD1 is turned off.

Afterward, at time t212, a pulse of the shift signal is output from the CLKOUT terminal of the ASIC 575 and input into the CLKIN terminal of the shift register 540. Thereby, in the same manner as described above, the shift register 540 is brought into the state "4" in which the CH4 terminal is in the LOW output state, and the second light emitting element LD2 is turned on to emit light. After the second light emitting element LD2 is turned on to emit light, the quantity of light emitted by the second light emitting element LD2 is adjusted based on the quantity of the second back laser light L2A received by the optical sensor 590. Then, at time t213, a pulse of the shift signal is output from the CLKOUT terminal of the ASIC 575 and input into the CLKIN terminal of the shift register 540. Thereby, the shift register 540 is brought into the state "5" in which the CH5 terminal is in the LOW output state. Thereby, the second light emitting element LD2 is turned off.

Afterward, at time t214, a pulse of the shift signal is output from the CLKOUT terminal of the ASIC 575 and input into the CLKIN terminal of the shift register 540. Thereby, in the same manner as described above, the shift register 540 is brought into the state "6" in which the CH6 terminal is in the LOW output state, and the third light emitting element LD3 is turned on to emit light. After the third light emitting element LD3 is turned on to emit light, the quantity of light emitted by the third light emitting element LD3 is adjusted based on the quantity of the third back laser light L3A received by the optical sensor 590. Then, at time t215, a pulse of the shift signal is output from the CLKOUT terminal of the ASIC 575 and input into the CLKIN terminal of the shift register 540. Thereby, the shift register 540 is brought into the state "7" in which the CH7 terminal is in the LOW output state. Thereby, the third light emitting element LD2 is turned off.

Afterward, at time t216, a pulse of the shift signal is output from the CLKOUT terminal of the ASIC 575 and input into the CLKIN terminal of the shift register 540. Thereby, in the same manner as described above, the shift register 540 is brought into the state "8" in which the CH8 terminal is in the LOW output state, and the fourth light emitting element LD4 is turned on to emit light. After the fourth light emitting element LD4 is turned on to emit light, the quantity of light emitted by the fourth light emitting element LD4 is adjusted based on the quantity of the fourth back laser light L4A received by the optical sensor 590. At and after the time t216, the beam detector 560 is put in the light reception waiting state to wait until receiving the beam of the fourth laser light L4. At time t217, the beam detector 560 receives the beam of the fourth laser light L4. Thereby, at this time, a detection signal (hereinafter, which may be referred to as a "BD signal") from the beam detector 560 to bring the electric potential of the signal line SI into the LOW state is input into the BDIN terminal of the ASIC 575. After the SIGOUT terminal of the ASIC 575 is brought into the LOW output state at time t218, at time t219, a single clock pulse of the shift signal is output from the CLKOUT terminal of the ASIC 575 and input into the CLKIN terminal of the shift register 540. Further, at time t220, the SIGOUT terminal is brought into the HIGH output state. Thereby, the shift register 540 is brought into the state "1" corresponding to the initial state. Through the input of the detection signal at the time t217, the ASIC 575 receives the detection signal from the beam detector 560 that has detected the beam of the fourth laser light L4 emitted by the fourth light emitting element LD4.

Afterward, substantially the same control as performed from the time t201 until the time t219 is repeated as needed.

FIG. 8 shows a second illustrative embodiment in which the exposure device 500 has a smaller number of connection lines between the ASIC 575 and the shift register 540 than in the aforementioned first illustrative embodiment. More specifically, in the second illustrative embodiment shown in FIG. 8, the ASIC 575 has a new BDIN2 terminal that is a unified terminal serving as both the BDIN terminal and the SIGOUT terminal as described in the aforementioned first illustrative embodiment (see FIG. 4). Only at the time when the printer 10 starts printing, the BDIN2 terminal is set as an output terminal having substantially the same function as the SIGOUT terminal in the aforementioned first illustrative embodiment (see FIG. 4). After the shift register 540 is set to the initial state, the BDIN2 terminal is set as an input terminal having substantially the same function as the BDIN terminal in the aforementioned first illustrative embodiment (see FIG. 4).

FIG. 9 is a time chart in a start process to be performed by the exposure device 500 when the printer 10 starts printing, in the second illustrative embodiment according to aspects of the present disclosure. The time chart shown in FIG. 9 corresponds to the time chart shown in FIG. 5 in the aforementioned first illustrative embodiment. In FIG. 9, each of substantially the same operations and processes as exemplified in FIG. 5 is associated with the same time as shown in FIG. 5.

First, in substantially the same manner as in the aforementioned first illustrative embodiment, it is required to set the shift register 540 to the initial state prior to rotating the motor 532. Therefore, the BDIN2 terminal of the ASIC 575 is put in the HIGH output state. Further, at time t300, a pulse of the shift signal is output from the CLKOUT terminal of the ASIC 575 and input into the CLKIN terminal of the shift register 540. Thereby, the CH1 terminal of the shift register 540 is brought into the HIGH output state. Subsequently, at time t301, a pulse of the shift signal is output from the CLKOUT terminal of the ASIC 575 and input into the CLKIN terminal of the shift register 540. Thereby, the CH1 terminal and the CH2 terminal of the shift register 540 are brought into the HIGH output state. Next, at time t302, a pulse of the shift signal is output from the CLKOUT terminal of the ASIC 575 and input into the CLKIN terminal of the shift register 540. Thereby, the CH1 to CH3 terminals of the shift register 540 are brought into the HIGH output state. Likewise, at each timing of time t303, time t304, time t305, and time t306, a pulse of the shift signal is output from the CLKOUT terminal of the ASIC 575 and input into the CLKIN terminal of the shift register 540. Thereby, the CH1 to CH7 terminals of the shift register 540 are brought into the HIGH output state. Subsequently, at time t307, the BDIN2 terminal of the ASIC 575 is brought into the LOW output state. Afterward, at time t308, a pulse of the shift signal is output from the CLKOUT terminal of the ASIC 575 and input into the CLKIN terminal of the shift register 540. Thereby, the shift register 540 is set to the aforementioned initial state where the CH1 terminal is in the LOW output state, and the CH2 to CH8 terminals are in the HIGH output state. Thus, the shift register 540 is put in the state "1."

Afterward, at time t309, the state of the BDIN2 terminal is changed to an input state. When the beam detector 560 does not detect light, the BDIN2 terminal is in the HIGH input state. Therefore, the state of an input signal into the SIGIN terminal of the shift register 540 is HIGH. Since subsequent operations and processes are substantially the same as described above with reference to FIG. 5, an explanation thereof is omitted. While the beam detector 560 is not detecting light, the SIGIN terminal of the shift register 540 is in the HIGH input state.

FIG. 10 is a time chart in a printing process to be performed by the printer 10 in the second illustrative embodiment. The time chart shown in FIG. 10 corresponds to the time chart shown in FIG. 6 in the aforementioned first illustrative embodiment. In FIG. 10, each of substantially the same operations and processes as exemplified in FIG. 6 is associated with the same time as shown in FIG. 6.

In the second illustrative embodiment (see FIG. 8) as well, in the substantially the same manner as performed during the printing process in the aforementioned first illustrative embodiment (see FIG. 4), processes are repeated which include printing based on the image data, adjusting the quantities of light emitted by the first to fourth light emitting elements LD1 to LD4, and inputting the detection signal output from the beam detector 560 in response to light emission by the fourth light emitting element LD4. Nonetheless, in the second illustrative embodiment, instead of the signal from the SIGOUT terminal in the aforementioned first illustrative embodiment, a pulse of the shift signal is output from the CLKOUT terminal at substantially the same timing as when the electric potential of the connection line CL corresponding to the output from the beam detector 560 is brought into the LOW state. Thereby, the shift register 540 is set to the initial state.

Specifically, in FIG. 10, after detecting the LOW state of the BDIN2 terminal at time t401, the ASIC 575 outputs a pulse of the shift signal from the CLKOUT terminal at time t403. Based on the received pulse, the shift register 540 shifts the outputs from the CH1 to CH7 terminals, by one in the reference numeral order of the CH1 to CH8 terminals, to be outputs from the CH2 to CH8 terminals, respectively. Further, the shift register 540 sets the CH1 terminal to the same state as the BDIN2 terminal. Consequently, the shift register 540 is brought into the state "1," and the fourth light emitting element LD4 is turned off. Since subsequent operations and processes are substantially the same as described above with reference to FIG. 6, an explanation thereof is omitted.

In the second illustrative embodiment, the BDIN2 terminal of the ASIC 575 functions as an output terminal at the time when the printing process is started, and thereafter functions as an input terminal. Thereby, as shown in FIG. 10, even though the number of output signals from the ASIC 575 is reduced, the printer 10 may have substantially the same functions as in the aforementioned first illustrative embodiment.

As described above, during the printing process, the ASIC 575 sends to the shift register 540 a pulse of the shift signal at each of the times t210, t212, t214, and t216, thereby causing the shift register 540 to sequentially output the light emission signal for each of the N light emitting elements LD (in the examples shown in FIGS. 6 and 10, the four light emitting elements LD). The optical sensor 590 detects the quantity of light sequentially emitted by each of the N light emitting elements LD. The ASIC 575 causes the beam of the N-th laser light L (in the examples shown in FIGS. 6 and 10, the fourth laser light L4) from the N-th one of the N light emitting elements LD to be incident onto the beam detector 560 at the time t217. In response to the beam detector 560 receiving the beam of the N-th laser light L from the N-th light emitting element LD, the shift register 540 is set to the initial state. In the examples shown in FIGS. 6 and 10, in response to the beam detector 560 receiving the beam of the fourth laser light L4 from the fourth light emitting element LD4 at the time t217, the shift register 540 is set to the initial state at the time t219.

As described above, in the aforementioned first and second illustrative embodiments, the support frame 101 supports the controller 570 and the scanning unit 505 that includes the multi beam laser 510 and the shift register 540. The ASIC 575 of the controller 570 is connected with the scanning unit 505 via the signal lines S1, S2, S3, S4, SC, and SI or SR. The ASIC 575 outputs a shift signal from CLKOUT terminal. The shift register 540, which has received via the CLKIN terminal the shift signal transmitted through the signal line SC, outputs the light emission signal for each of the N light emitting elements LD of the multi beam laser 510 via a corresponding one of the CH2, CH4, CH6, and CH8 terminals. Each light emitting element LD is turned on to emit light in response to the light emission signal therefor being output from the shift register 540. Therefore, it is possible to cause each light emitting element LD to emit light, only by using the shift signal transmitted via the single signal line SC connecting the ASIC 575 with the shift register 540. Consequently, it is possible to reduce the number of signal lines extending from the ASIC 575 to cause the light emitting elements LD to emit light.

Further, in the aforementioned illustrative embodiments, in the start process and the printing process, the shift register 540, which has received a shift signal, sequentially outputs a light emission signal for each of the N light emitting elements LD. Each of the N light emitting elements LD is sequentially turned on to emit light in response to the light emission signal therefor being output from the shift register 540. Further, the optical sensor 590 receives the back laser light LA from one of the N light emitting elements LD that is turned on to emit light, thereby detecting the quantity of light emitted by the corresponding light emitting element LD. Thus, the ASIC 575 may transmit the shift signal to the shift register 540 via the single signal line SC, thereby performing so-called APC ("APC" is an abbreviation of "Automatic Power Control") to cause each light emitting element LD to individually emit light and detect the quantity of light emitted by each light emitting element LD.

Further, in the aforementioned illustrative embodiments, in the start process and the printing process, the beam of the N-th laser light L emitted by the N-th light emitting element LD, which is turned on last among the N light emitting elements LD that are sequentially turned on, is rendered incident onto the beam detector 560 at the times t190 and t217. Therefore, it is possible to detect normal light emission and normal light scanning by using the beam detector 560, at substantially the same time as completion of the APC for the N-th light emitting element LD by using the optical sensor 590.

Further, in the aforementioned illustrative embodiments, in the start process, when the beam of the n-th laser light L emitted by the n-th light emitting element LD is incident onto the beam detector 560, the shift register 540 outputs a light emission signal for the (n+1)-th light emitting element LD based on a shift signal from the ASIC 575. Therefore, it is possible to cause each of the N light emitting elements LD to individually emit light one by one in sequence based on the shift signal output from the ASIC 575. Further, it is possible to detect normal light emission and normal light scanning while each light emitting element LD is emitting light.

Further, in the aforementioned illustrative embodiments, in the start process, when the beam of the n-th laser light emitted by the n-th light emitting element LD is incident onto the beam detector 560, the shift register 540 turns off the n-th light emitting element LD based on a shift signal from the ASIC 575. Thereafter, the shift register 540 outputs a light emission signal for the (n+1)-th light emitting element LD based on another shift signal from the ASIC 575. Thus, the n-th light emitting element LD is turned off before the (n+1)-th light emitting element LD is turned on to emit light. Thereby, it is possible to surely detect that the (n+1)-th light emitting element LD has been turned on to emit light.

Further, in the aforementioned illustrative embodiments, in the start process, after the beam of the N-th laser light emitted by the N-th light emitting element LD is incident onto the beam detector 560 at the time t190, the shift register 540 is restored to the initial state at the time t192. Therefore, it is possible to restore the shift register 540 to the initial state at substantially the same time as detecting normal light emission and normal light scanning by using the beam detector 560.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

In the aforementioned illustrative embodiments, the exposure device 500 includes the CH1 to CH8 terminals, the CLKIN terminal, the SIGIN terminal, the LD1OUT to LD4OUT terminals, the PDIN terminal, the DATA1IN to DATA4IN terminals, the XSH1 to XSH4 terminals, the DATA1 to DATA4 terminals, the CLKOUT terminal, the SIGOUT terminal and the BDIN terminal (in the second illustrative embodiment, the BDIN2 terminal instead of the SIGOUT terminal and the BDIN terminal). Nonetheless, instead of these physical terminals, the exposure device 500 may include internal interfaces such as ports having substantially the same functions as the above terminals. Further, the shift register 540 may not be a stand-alone IC as described in the aforementioned illustrative embodiments, but may be an IC integrated with the LD driver 580 having the light quantity adjuster 582. In other words, as shown in FIG. 11, the LD driver 580 may be an IC including the shift register 540. For instance, when the shift register 540 is functionally incorporated in an IC having other function(s), a CLKIN port and a SIGIN port may be provided instead of the CLKIN terminal and the SIGIN terminal. Further, CH1 to CH8 ports may be provided instead of the CH1 to CH8 terminals.

The following shows examples of associations between elements exemplified in the aforementioned illustrative embodiments and modifications and elements according to aspects of the present disclosure. The printer 10 may be an example of an "image forming apparatus" according to aspects of the present disclosure. The photoconductive body 610 may be an example of a "photoconductive body" according to aspects of the present disclosure. The exposure device 500 may be an example of an "optical scanning device" according to aspects of the present disclosure. The controller 570 may be an example of a "controller" according to aspects of the present disclosure. The scanning unit 505 may be an example of a "scanning unit" according to aspects of the present disclosure. The signal line SC may be an example of a "signal line" according to aspects of the present disclosure. The multi beam laser 510 may be an example of a "semiconductor laser" according to aspects of the present disclosure. The first lens section 515 may be an example of an "optical system" according to aspects of the present disclosure. The polygon mirror 530 may be an example of a "deflector" according to aspects of the present disclosure. The shift register 540 may be an example of a "shift register" according to aspects of the present disclosure. The CH2 terminal, the CH4 terminal, the CH6 terminal, and the CH8 terminal may be an example of a "plurality of output interfaces" according to aspects of the present disclosure. The CLKIN terminal may be an example of an "input interface" according to aspects of the present disclosure. The optical sensor 590 may be an example of a "light quantity sensor" according to aspects of the present disclosure. The beam detector 560 may be an example of an "optical sensor" according to aspects of the present disclosure. The LD driver 580 may be an example of a "laser diode driver" according to aspects of the present disclosure. The XSH1 to XSH4 terminals may be an example of a "plurality of light emission signal receiving interfaces" according to aspects of the present disclosure. The LD1OUT to LD4OUT terminals may be an example of a "plurality of light emission control interfaces" according to aspects of the present disclosure. The PDIN terminal may be an example of a "detection signal receiving interface" according to aspects of the present disclosure. The light quantity adjuster 582 may be an example of a "light quantity adjuster" according to aspects of the present disclosure.

What is claimed is:

1. An optical scanning device comprising:
   a controller; and
   a scanning unit connected with the controller via a signal line, the scanning unit comprising:
      a semiconductor laser comprising N light emitting elements, N being a natural number equal to or more than two;
      an optical system configured to convert light emitted by each of the N light emitting elements into a beam;
      a deflector configured to deflect the beam received through the optical system; and
      a shift register comprising:
         a plurality of output terminals each configured to output a light emission signal for controlling light emission from a corresponding one of the N light emitting elements; and
         an input terminal configured to receive a shift signal from the controller via the signal line, the shift register being configured to, each time receiving the shift signal from the controller via the input terminal, shift a specific output terminal from one output terminal to another in sequence among the plurality of output terminals and output the light emission signal via the specific output terminal, thereby controlling light emission from each of the N light emitting elements.

2. The optical scanning device according to claim 1, wherein controller is configured to control the shift register to sequentially output the light emission signal for each of the N light emitting elements via a corresponding one of the plurality of output terminals, by transmitting the shift signal to the shift register, and
wherein the semiconductor laser further comprises an optical sensor configured to detect the light emitted by each of the N light emitting elements, the N light emitting elements being controlled to sequentially emit light based on the light emission signal output from the shift register.

3. The optical scanning device according to claim 1, wherein the semiconductor laser further comprises an optical sensor configured to detect the light emitted by each of the N light emitting elements and output a detection signal corresponding to the detected the light, and
wherein the optical scanning device further comprises a laser diode driver comprising:
a plurality of light emission signal receiving terminals each configured to receive the light emission signal from a corresponding one of the plurality of output terminals of the shift register;
a plurality of light emission control terminals each connected with a corresponding one of the N light emitting elements, each light emission control terminal being configured to switch a state of the corresponding light emitting element between a light emitting state and a turned-off state, based on the light emission signal received from the shift register via a corresponding one of the plurality of light emission signal receiving terminals; and
a detection signal receiving terminal configured to receive the detection signal from the optical sensor.

4. The optical scanning device according to claim 3, wherein the laser diode driver further comprises a light quantity adjuster configured to, when an individual one of the N light emitting elements is turned on to emit light based on the light emission signal from the shift register via a corresponding light emission signal receiving terminal, adjust a quantity of the light emitted by the individual one of the N light emitting elements based on the detection signal output from the optical sensor.

5. The optical scanning device according to claim 1, further comprising a beam detector configured to receive the beam deflected by the deflector,
wherein the controller is configured to cause each of the N light emitting elements to sequentially emit light by transmitting the shift signal to the shift register, and render the beam of the light emitted by an N-th one of the N light emitting elements incident onto the beam detector.

6. The optical scanning device according to claim 1, further comprising a beam detector configured to receive the beam deflected by the deflector,
wherein the controller is configured to, when the beam detector receives the beam of the light emitted by an n-th one of the N light emitting elements, transmit the shift signal to the shift register, thereby causing the shift register to output the light emission signal for an (n+1)-th one of the N light emitting elements, n being a natural number less than N.

7. The optical scanning device according to claim 6, wherein the controller is configured to:
when the beam detector receives the beam of the light emitted by the n-th one of the N light emitting elements, transmit the shift signal to the shift register, thereby turning off the n-th light emitting element; and
after turning off the n-th light emitting element, transmit the shift signal to the shift register, thereby causing the shift register to output the light emission signal for the (n+1)-th light emitting element.

8. The optical scanning device according to claim 1, further comprising a beam detector configured to receive the beam deflected by the deflector,
wherein the controller is configured to, when the beam detector receives the beam of the light emitted by one of the N light emitting elements, cause the shift register not to output the light emission signal for any of the N light emitting elements.

9. A laser diode driver comprising:
a plurality of light emission control terminals each connected with a corresponding one of N light emitting elements of a semiconductor laser, N being a natural number equal to or more than two;
a detection signal receiving terminal configured to receive a detection signal output from an optical sensor of the semiconductor laser; and
a shift register comprising:
a plurality of output ports each configured to output a light emission signal for controlling light emission from a corresponding one of the N light emitting elements; and
an input port configured to receive a shift signal, the shift register being configured to, each time receiving the shift signal via the input port, shift a specific output port from one output port to another in sequence among the plurality of output ports and output the light emission signal via the specific output port,
wherein each of the plurality of light emission control terminals is configured to switch a state of the corresponding light emitting element between a light emitting state and a turned-off state, based on the light emission signal received from a corresponding one of the plurality of output ports of the shift register.

10. The laser diode driver according to claim 9, further comprising a light quantity adjuster configured to, when an individual one of the N light emitting elements is turned on to emit light based on the light emission signal from a corresponding output port of the shift register, adjust a quantity of the light emitted by the individual one of the N light emitting elements based on the detection signal output from the optical sensor.

11. An image forming apparatus comprising:
a photoconductive body;
a controller; and
a scanning unit connected with the controller via a signal line, the scanning unit comprising:
a semiconductor laser comprising N light emitting elements, N being a natural number equal to or more than two;
an optical system configured to convert light emitted by each of the N light emitting elements into a beam;

a deflector configured to deflect the beam received through the optical system; and a shift register comprising:
  a plurality of output interfaces each configured to output a light emission signal for controlling light emission from a corresponding one of the N light emitting elements; and
  an input interface configured to receive a shift signal from the controller via the signal line, the shift register being configured to, each time receiving the shift signal from the controller via the input interface, shift a specific output interface from one output interface to another in sequence among the plurality of output interfaces and output the light emission signal via the specific output interface, thereby controlling light emission from each of the N light emitting elements.

12. The image forming apparatus according to claim 11, wherein controller is configured to control the shift register to sequentially output the light emission signal for each of the N light emitting elements via a corresponding one of the plurality of output interfaces, by transmitting the shift signal to the shift register, and
wherein the semiconductor laser further comprises an optical sensor configured to detect the light emitted by each of the N light emitting elements, the N light emitting elements being controlled to sequentially emit light based on the light emission signal output from the shift register.

13. The image forming apparatus according to claim 11, wherein the semiconductor laser further comprises an optical sensor configured to detect the light emitted by each of the N light emitting elements and output a detection signal corresponding to the detected light, and
wherein the optical scanning device further comprises a laser diode driver comprising:
  a plurality of light emission signal receiving interfaces each configured to receive the light emission signal from a corresponding one of the plurality of output interfaces of the shift register;
  a plurality of light emission control interfaces each connected with a corresponding one of the N light emitting elements, each light emission control interface being configured to switch a state of the corresponding light emitting element between a light emitting state and a turned-off state, based on the light emission signal received from the shift register via a corresponding one of the plurality of light emission signal receiving interfaces; and
  a detection signal receiving interface configured to receive the detection signal from the optical sensor.

14. The image forming apparatus according to claim 13, wherein the laser diode driver further comprises a light quantity adjuster configured to, when an individual one of the N light emitting elements is turned on to emit light based on the light emission signal from the shift register via a corresponding light emission signal receiving interface, adjust a quantity of the light emitted by the individual one of the N light emitting elements based on the detection signal output from the optical sensor.

15. The image forming apparatus according to claim 11, wherein the semiconductor laser further comprises an optical sensor configured to detect the light emitted by each of the N light emitting elements and output a detection signal corresponding to the detected the light, and
wherein the optical scanning device further comprises a laser diode driver comprising:
  the shift register;
  a plurality of light emission signal receiving interfaces each configured to receive the light emission signal from a corresponding one of the plurality of output interfaces of the shift register;
  a plurality of light emission control interfaces each connected with a corresponding one of the N light emitting elements, each light emission control interface being configured to switch a state of the corresponding light emitting element between a light emitting state and a turned-off state, based on the light emission signal received from the shift register via a corresponding one of the plurality of light emission signal receiving interfaces; and
  a detection signal receiving interface configured to receive the detection signal from the optical sensor.

16. The image forming apparatus according to claim 15, wherein the laser diode driver further comprises a light quantity adjuster configured to, when a corresponding one of the N light emitting elements is turned on to emit light based on the light emission signal from the shift register, adjust a quantity of the light emitted by the corresponding light emitting element based on the detection signal output from the optical sensor.

17. The image forming apparatus according to claim 13, further comprising a beam detector configured to receive the beam deflected by the deflector,
wherein the controller is configured to cause each of the N light emitting elements to sequentially emit light by transmitting the shift signal to the shift register, and render the beam of the light emitted by an N-th one of the N light emitting elements incident onto the beam detector.

* * * * *